(12) United States Patent
Matsushima et al.

(10) Patent No.: US 8,726,192 B2
(45) Date of Patent: May 13, 2014

(54) COMPUTER-READABLE STORAGE MEDIUM HAVING ACTIVATION CONTROL PROGRAM STORED THEREIN AND ACTIVATION CONTROL APPARATUS

(75) Inventors: Yoshihiro Matsushima, Kyoto (JP); Yuki Onozawa, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 841 days.

(21) Appl. No.: 12/246,822

(22) Filed: Oct. 7, 2008

(65) Prior Publication Data

US 2010/0083181 A1 Apr. 1, 2010

(30) Foreign Application Priority Data

Sep. 30, 2008 (JP) ................................. 2008-255354

(51) Int. Cl.
G06F 3/048 (2013.01)

(52) U.S. Cl.
USPC .......................................... 715/835; 715/810

(58) Field of Classification Search
USPC .......... 715/835, 810, 764, 833; 345/156–181, 345/520, 521
See application file for complete search history.

(56) References Cited

U.S. PATENT DOCUMENTS

| | | | | |
|---|---|---|---|---|
| 6,711,715 | B1* | 3/2004 | Grealish ........................ | 715/206 |
| 6,757,716 | B1 | 6/2004 | Blegen et al. | |
| 7,437,005 | B2* | 10/2008 | Drucker et al. ............... | 382/224 |
| 2002/0109728 | A1 | 8/2002 | Tiongson et al. | |
| 2004/0001105 | A1* | 1/2004 | Chew et al. .................... | 345/817 |
| 2005/0091596 | A1* | 4/2005 | Anthony et al. .............. | 715/712 |
| 2005/0268127 | A1* | 12/2005 | Shiba et al. ................... | 713/320 |
| 2007/0186177 | A1* | 8/2007 | Both et al. ..................... | 715/764 |
| 2008/0171595 | A1* | 7/2008 | Nakasaka ........................ | 463/31 |

FOREIGN PATENT DOCUMENTS

| | | |
|---|---|---|
| EP | 0 820 000 A1 | 1/1998 |
| EP | 1 221 652 A2 | 7/2002 |
| JP | 2004-348601 | 12/2004 |
| JP | 2005-269243 A | 9/2005 |
| JP | 2007-80231 A | 3/2007 |
| JP | 2007-179168 A | 7/2007 |
| WO | WO 2008/033853 A2 | 3/2008 |

OTHER PUBLICATIONS

Partial European Search Report mailed Jun. 21, 2012 in European Application No. 08021814.2 (5 pages).
Extended European Search Report mailed Nov. 7, 2012 in European Application No. 08021814.2.

* cited by examiner

*Primary Examiner* — Andrea Leggett
(74) *Attorney, Agent, or Firm* — Nixon & Vanderhye P.C.

(57) ABSTRACT

A system is disclosed including:
a first display control section 218 for selectively displaying, in a first display area, a second predetermined number of first objects among first objects, corresponding to a first predetermined number of game programs, for which an order is set; a second display control section 219 for displaying a position designation image at a position corresponding to a position, of subject software, in an order set for the first predetermined number of pieces of software; a display change section 217 for designating a first object to be displayed in the first display area, based on an operation input received by using the position designation image; and an activation execution section 220 for activating software corresponding to one first object which is selected from among the second predetermined number of first objects displayed in the first display area, based on the operation input.

47 Claims, 21 Drawing Sheets

F I G. 1
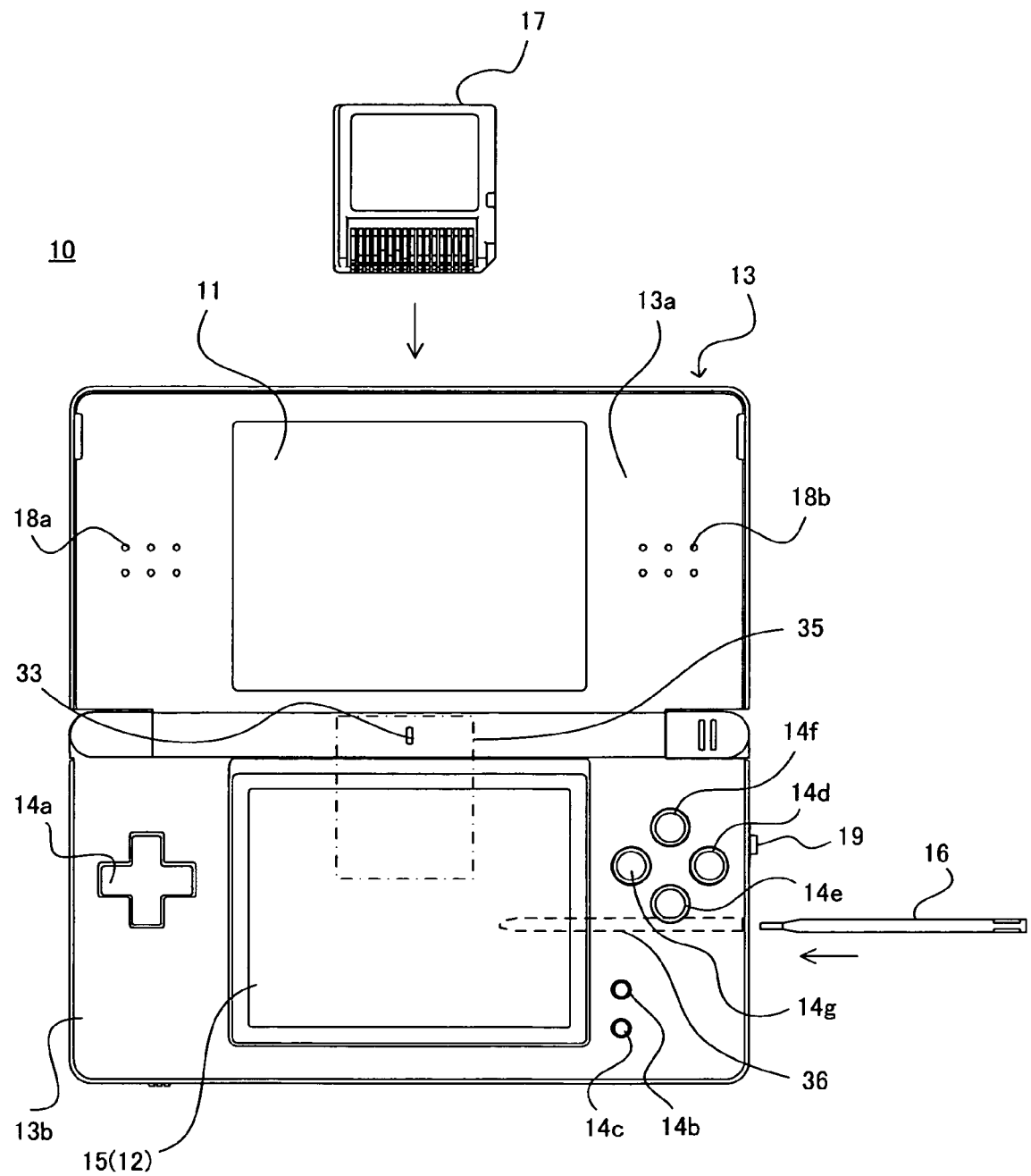

FIG. 5

| POSITION-IN-DISPLAY-ORDER NUMBER | APPLICATION ID | FIRST IMAGE ID | SECOND IMAGE ID | DISPLAY POSITION FLAG | NON-OPEN STATE FLAG | BLINK FLAG |
|---|---|---|---|---|---|---|
| 1 | A01 | B01 | C01 | 0 | 0 | 0 |
| 2 | A02 | B02 | C02 | 0 | 0 | 0 |
| 3 | A03 | B03 | C03 | 0 | 0 | 0 |
| 4 | A04 | B04 | C04 | 0 | 0 | 0 |
| 5 | A05 | B05 | C05 | 0 | 0 | 0 |
| 6 | A06 | B06 | C06 | 0 | 0 | 0 |
| ... | ... | ... | ... | ... | ... | ... |
| N−1 | A(N−1) | B(N−1) | C(N−1) | 0 | 0 | 0 |
| N | AN | BN | CN | 1 | 1 | 1 |
| N+1 | 0 | 0 | 0 | 0 | 0 | 0 |
| ... | ... | ... | ... | ... | ... | ... |
| 39 | 0 | 0 | 0 | 0 | 0 | 0 |
| 40 | 0 | 0 | 0 | 0 | 0 | 0 |

F I G. 6
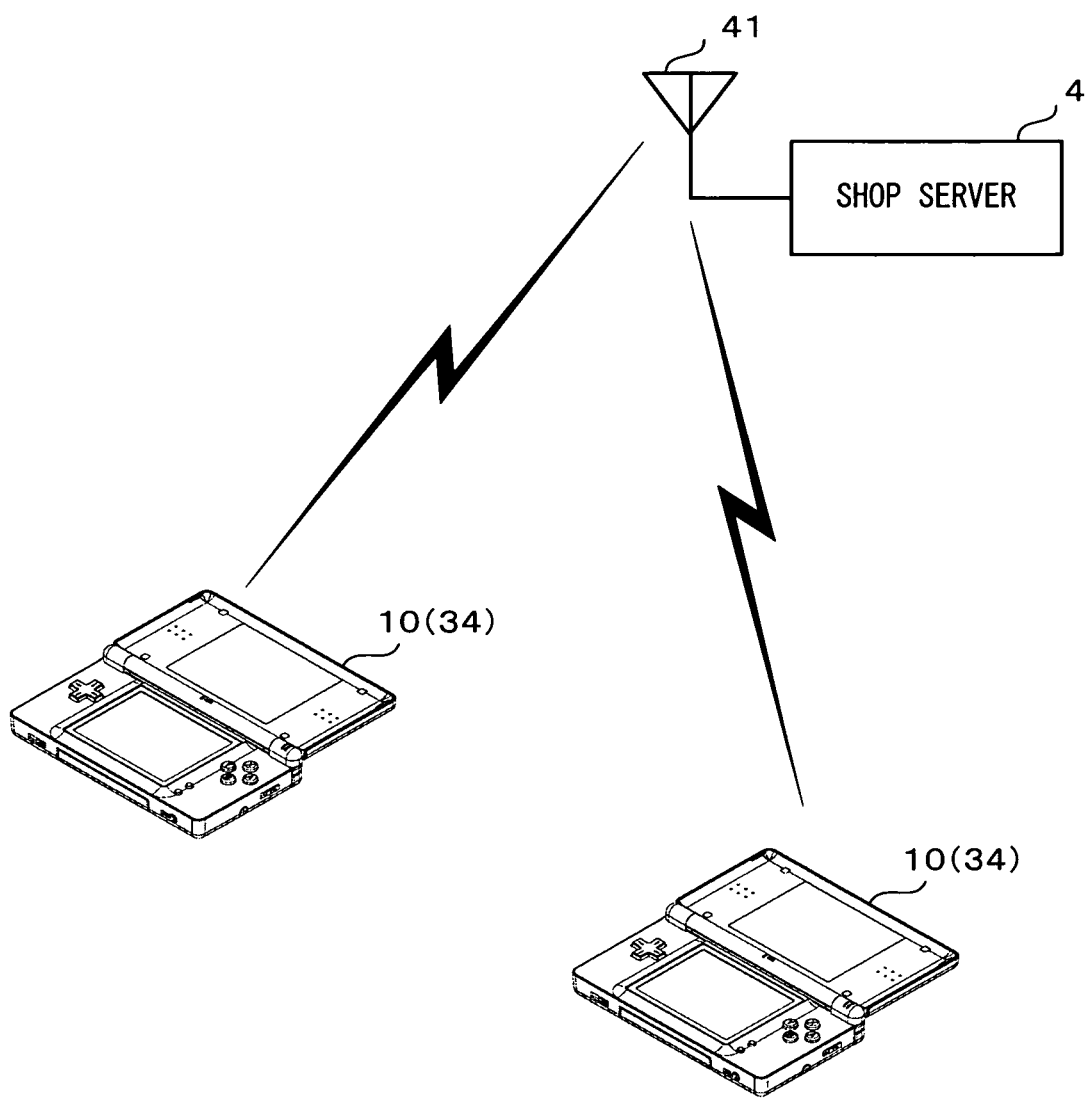

F I G. 7
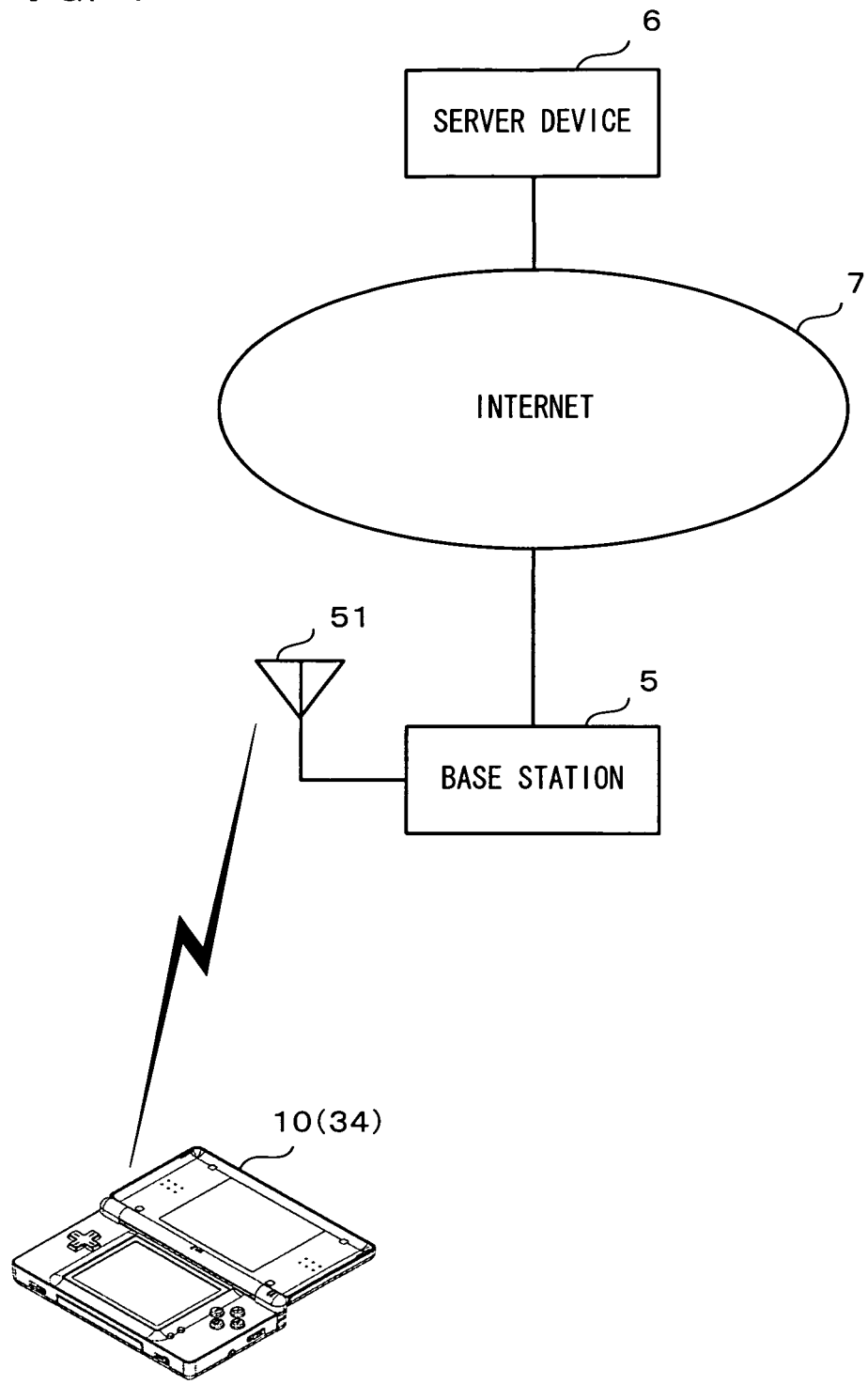

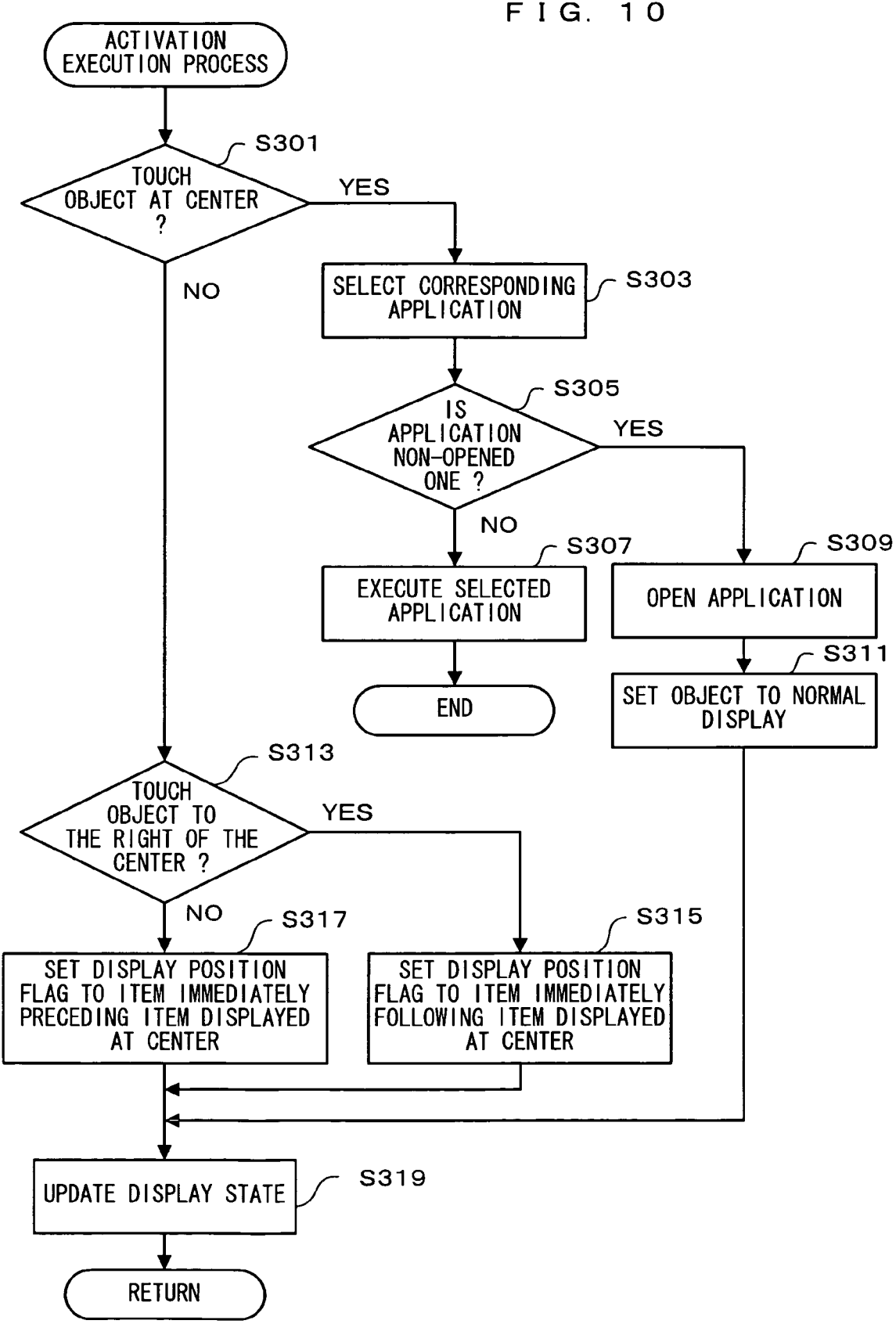
F I G. 10

COMPUTER-READABLE STORAGE MEDIUM HAVING ACTIVATION CONTROL PROGRAM STORED THEREIN AND ACTIVATION CONTROL APPARATUS

CROSS REFERENCE TO RELATED APPLICATION

The disclosure of Japanese Patent Application No. 2008-255354, filed on Sep. 30, 2008, is incorporated herein by reference.

BACKGROUND AND SUMMARY

1. Technical Field

The technology presented herein relates to a computer-readable storage medium having stored therein an activation control program for selecting one of a first predetermined number of pieces of software where the first predetermined number of pieces of software is greater than or equal to two, and activating the selected software, and an activation control apparatus, and more particularly to a computer-readable storage medium having stored therein an activation control program for controlling activation of application software (=game program) for executing a game, and an activation control apparatus.

2. Description of the Background Art

Conventionally, used as a method for activating software desired by a user through a one-time operation is a method for receiving an instruction issued by a user by, for example, tapping on one of icons, on a screen, corresponding to a plurality of pieces of software installed. However, there is a problem that, when the method as described above is used for a PDA (Personal Digital Assistant) having a relatively small display, or the like, the number of icons which can be simultaneously displayed may be reduced.

In order to solve the aforementioned problem, various methods, various apparatuses, and the like have been suggested. For example, Japanese Laid-Open Patent Publication No. 2004-348601 discloses an information processing apparatus in which a curvature slider which can be slid by a user is displayed, and the number of application icons which can be simultaneously displayed in a normal display area can be increased in accordance with the curvature slider being slid from left to right, without reducing the size of each application icon.

However, in the information processing apparatus, although the number of icons which can be simultaneously displayed can be increased, positions of undisplayed icons may be recognized only by performing scrolling, or the like. Further, the information processing apparatus does not help a user activate a specific application.

The present technology is made to solve the aforementioned problems, and a feature of an example embodiment presented herein is to provide an activation control program and an activation control apparatus capable of easily selecting and activating desired software.

The present embodiment has the following features to attain the above. The reference numerals and figure numbers in the parentheses indicate an exemplary correspondence with the drawings in order to aid in understanding the present embodiment and are not intended to limit, in any way, the scope of the present embodiment.

An activation control program (240) according to the present embodiment is an activation control program executed by a predetermined information processing apparatus (10) which selects and activates one of a first predetermined number (for example, 40) of pieces of software, and the first predetermined number of pieces of software is greater than or equal to two.

A first aspect is an activation control program for causing a computer (21) to function as: first display control means (218); second display control means (219); display change means (214, 217); and activation execution means (220). The first display control means (218) selectively displays, in a first display area (801: see FIG. 17) on a monitor (12), a second predetermined number (here, 3) of first objects (801b, 801c, 801d: see FIG. 17) among first objects corresponding to the first predetermined number (for example, 16) of pieces of software, respectively, and the second predetermined number is smaller than the first predetermined number.

Further, the second display control means (219) displays, in a second display area (802: see FIG. 17) different from the first display area (801: see FIG. 17) on the monitor (12), a position designation image (802b: see FIG. 17) representing subject software among the first predetermined number (for example, 16) of pieces of software, at a position based on positions in the order set for the first predetermined number of pieces of software.

Furthermore, the display change means (214, 217) receives an operation input from outside, and changes, based on the operation input having been received, the second predetermined number of first objects (801b, 801c, 801d: see FIG. 17) to be displayed in the first display area (801: see FIG. 17). In addition, the activation execution means (220) receives an operation input from outside, and selects, based on the operation input having been received, one of the second predetermined number of first objects (801b, 801c, 801d: see FIG. 17) displayed in the first display area (801: see FIG. 17), and activates software corresponding to the selected one of the second predetermined number of first objects.

The first objects are objects corresponding to the first predetermined number (for example, 16) of pieces of software, respectively, and are displayed in the first display area. The activation control means (220) selects one of the first objects displayed in the first display area, so as to activate the software corresponding to the selected first object. The first object is preferably an object by which each piece of software is identified. However, it may be difficult to identify each piece of software by the first object (for example, one object may correspond to different pieces of software).

The activation control program according to the present embodiment has a predetermined algorithm or table by which a position in the second display area is determined based on the order set for the first predetermined number (for example, 16) of pieces of software. Based on the algorithm or table, for example, the position is determined such that the smaller the position-in-order number is, the closer the position is to one end portion (for example, the left end, the top left end, or the like) of the second display area, and the greater the position-in-order number is, the closer the position is to the other end portion (for example, the right end, the bottom right end, or the like) thereof. At this time, the second object corresponding to the software for which the position in the order is set smaller is displayed near the one end portion of the second display area, and the second object corresponding to the software for which the position in the order is set greater is displayed near the other end portion thereof.

Further, when a coordinate is inputted on the second display area, the display change means (214, 217) displays, in the first display area, the first object corresponding to the software for which the position in the order is set smaller in a case where the coordinate is inputted near the one end portion of the second display area, and displays, in the first display area, the first object corresponding to the software for which the position in the order is set greater in a case where the coordinate is inputted near the other end portion of the second display area. The display change means (214, 217) may gradually change the first objects to be displayed in the first display area, in accordance with the order thereof, by means of a predetermined scrolling means (hardware key, touch key, or the like).

According to the present embodiment, the "subject software" is software for which the position designation image is displayed in the second display area.

Although the subject software includes, for example, the following software, the subject software is not limited thereto.

(1) Predetermined specific software (for example, software having a specific title)

(2) Software for causing the computer (21) of the information processing apparatus (10) to perform a specific processing. In particular, software for executing a process (for example, communication process) using a predetermined function (for example, communication function) of the information processing apparatus (10).

(3) Card software in a case where both incorporated software and card software are able to be activated.

(4) Downloaded software (which may be all downloaded software or only unused software having been downloaded)

(5) Software which are frequently used by a user (this can be realized when the number of times each software is activated is stored in a non-volatile manner)

The "position designation image" is an image displayed at a position, in the second area, determined based on a position of the subject software in the order, and any display method can be used. When the "position designation image" is displayed, a user can recognize a position of the "subject software". Based on this, the display change means (214, 217) appropriately changes the first objects displayed in the first display area, and displays, in the first display area, the first object corresponding to the subject software, and the activation execution means (220) is able to activate the subject software.

Although the "position designation image" includes, for example, the following images, the position designation image is not limited to the following examples.

(1) An object or the like is constantly displayed at a position of the "subject software" in the order in the second display area. The object or the like in this case is the "position designation image". The object may be an image by which each software can be identified, or an image by which each software cannot be identified. In the case of (1), in the second display area, (1-1) objects or the like may be displayed at positions based on the order set for the first predetermined number of pieces of software, and only "the subject software" may be displayed so as to represent an object different from objects corresponding to other software.

(1-2) an object may be displayed only at a position corresponding to a position, of the "subject software", in the order.

Further, when predetermined requirements are satisfied, the "position designation image" may be displayed. For example, when predetermined requirements are satisfied in (1-1) or (1-2) described above, the display state of the object or the like corresponding to the subject software may be changed or the object or the like may be highlighted. When, for example, the display state is changed, or the object is highlighted as described above, a user takes notice of a position of the "subject software". The change of the display state or the highlighting as described above is equivalent to the "position designation image".

(2) The first predetermined number of pieces of software may be displayed in the second display area (each software may be displayed such that the identification thereof is impossible), and when predetermined requirements are satisfied, only the "subject software" is displayed in a manner different from that for other software.

In other words, according to the present embodiment, the "position designation image" represents both display for indicating a position of the subject software, and display for causing the subject software to be noted, and one of the displays may be made, or both of the displays may be made. The second display area is preferably narrower than the first display area.

An activation control program according to a second aspect is the activation control program based on the first aspect, and the display change means (214, 217) receives an operation input from outside on the second display area (802: see FIG. 17), and changes, based on the operation input having been received, the second predetermined number of first objects (801b, 801c, 801d: see FIG. 17) to be displayed in the first display area (801: see FIG. 17). Therefore, it is possible to easily select and activate the subject software.

An activation control program according to a third aspect is the activation control program based on the first aspect, and the computer (21) is caused to further function as enablement determination means (211, 214) for determining whether or not a predetermined function of the predetermined information processing apparatus (10) is able to be used. Further, when the enablement determination means (211, 214) determines that the predetermined function is able to be used, the second display control means (219) displays the position designation image (802b: see FIG. 17) at a position corresponding to a position of the subject software in the order, among the first predetermined number of pieces of software. The subject software is software for causing the computer (21) to execute a predetermined process using the predetermined function. It is possible to easily select and activate software for causing the computer (21) to execute a predetermined process using a predetermined function An activation control program according to a fourth aspect is the activation control program based on the third aspect, and the computer (21) is configured such that a communication function for enabling a communication with a predetermined communication apparatus (4) is able to be used as the predetermined function. Further, the enablement determination means (211, 214) determines whether or not the communication with the predetermined communication apparatus (4) is enabled by using the communication function. Furthermore, the second display control means (219) sets, as the subject software, software for causing the computer (21) to perform a predetermined process using the communication function, among the first predetermined number of pieces of software, and displays the position designation image (802b: see FIG. 17) at a position corresponding to a position of the subject software in the order. Therefore, it is possible to easily select and activate software for causing the computer (21) to execute a predetermined process using the communication function.

An activation control program according to a fifth aspect is the activation control program based on the third aspect, and the first display control means (218) displays a first object (871c, 881c: see FIG. 24, FIG. 25) corresponding to the subject software, in a manner depending on a determination result obtained from the enablement determination means (211, 214), and the first object corresponding to the subject software is among the first objects corresponding to the first predetermined number of pieces of software. Therefore, it is possible to easily determine, in a visual manner, whether or not the predetermined function is able to be used, based on the display state of the first object (871*c*, 881*c*: see FIG. 24, FIG. 25) displayed in the first display area.

An activation control program according to a sixth aspect is the activation control program based on the first aspect, and the second display control means (219) displays, in the second display area (802: see FIG. 17), second objects (802*a*, 802*b*: see FIG. 17) which are each smaller than the first objects, and which correspond to the first predetermined number of pieces of software, respectively, and displays, as the position designation image, a second object (802*b*: see FIG. 17) which corresponds to the subject software, and are among the second objects corresponding to the first predetermined number of pieces of software, so as to be distinguishable from the second objects (802*a*: see FIG. 17) other than the second object corresponding to the subject software. Therefore, it is possible to easily determine, in a visual manner, the position of the subject software in the order, based on the second object displayed in the second display area.

The second objects represent the respective software, and displayed in the second display area. The respective software may not be identified by the second objects (for example, one object may correspond to different pieces of software). However, the respective software may be identified by the second objects. Although a certain second object corresponding to the subject software may be the "position designation image", all the second objects do not correspond to the "position designation image". For example, in an example shown in FIG. 17 described below, the second object corresponds to, for example, the objects, 802*a* and 802*b*, and, among them, the second object 802*b* corresponds to the position designation image, and the second object 802*a* and the third object 802*c* do not correspond to the position designation image.

An activation control program according to the seventh aspect is the activation control program based on the six aspect, and the computer (21) is caused to further function as enablement determination means (211, 214) for determining whether or not a predetermined function of the predetermined information processing apparatus (10) is able to be used. Further, when the enablement determination means (211, 214) determines that the predetermined function is able to be used, the second display control means (219) displays the second object (872*b*, 882*b*: see FIG. 24, FIG. 25) corresponding to the subject software, in a manner depending on a determination result obtained from the enablement determination means (211, 214). Therefore, it is possible to easily determine, in a visual manner, whether or not the predetermined function can be used based on the second object displayed in the second display area.

An activation control program according to an eighth aspect is the activation control program based on the sixth aspect, and the second display control means (219) displays, as the position designation image, the second object (802*b*: see FIG. 17) corresponding to the subject software so as to be blinked. Therefore, the second object (802*b*: see FIG. 17) displayed in the second display area (802: see FIG. 17) enables the position of the subject software in the order to be recognized in a visual manner with enhanced easiness.

An activation control program according to a ninth aspect is the activation control program based on the sixth aspect, and the second display control means (219) performs, as a predetermined display, a display of the first predetermined number (for example, 16) of the second objects (802*a*, 802*b*: see FIG. 17) so as to linearly arrange the first predetermined number of the second objects. Therefore, the second objects (802*a*, 802*b*: see FIG. 17) displayed in the second display area (802: see FIG. 17) enable the position of the subject software in the order to be recognized in a visual manner with enhanced easiness.

An activation control program according to a tenth aspect is the activation control program based on the ninth aspect, and the second display control means (219) displays scroll buttons (804*a*, 804*b*: see FIG. 17), near both ends of the second display area (802: see FIG. 17), respectively, for scrolling the first display area (801: see FIG. 17) in which the second predetermined number (here, 3) of first objects (801*b*, 801*c*, 801*d*: see FIG. 17) are displayed. Further, when an operation input for scrolling the first display area in which the second predetermined number of first objects are displayed is received through one of the scroll buttons, the display change means (214, 217) scrolls, by means of the first display control means (218), the first display area in which the second predetermined number of first objects are displayed so as to change the second predetermined number of first objects to be displayed. Therefore, it is possible to easily change the second predetermined number of first objects displayed in the first display area.

An activation control program according to an eleventh aspect is the activation control program based on the sixth aspect, and, when an operation input for selecting the second object (832*b*: see FIG. 20) which corresponds to the subject software and is displayed by the second display control means (219) is received, the display change means (214, 217) displays, in the first display area, a first object (841*c*: see FIG. 21) which corresponds to the subject software and is among the first objects corresponding to the first predetermined number of pieces of software, by means of the first display control means (218). Therefore, it is possible to easily activate the subject software by using the second predetermined number of first objects displayed in the first display area.

An activation control program according to a twelfth aspect is the activation control program based on the sixth aspect, and the computer (21) is caused to further function as classification means (221) for classifying the first predetermined number of pieces of software into a predetermined number of types, and the predetermined number of types is greater than or equal to two. Further, the second display control means (219) displays the second objects which correspond to the first predetermined number (for example, 16) of pieces of software, respectively, and which are classified into the predetermined number of types by the classification means (221), so as to be each identified by one of the predetermined number of types. Therefore, it is possible to easily recognize, in a visual manner, the position-in-order for the software desired to be activated.

An activation control program according to a thirteenth aspect is the activation control program based on the sixth aspect, and the second display control means (219) displays third objects (802*c*: see FIG. 17) so as to be distinguishable from the first predetermined number of the second objects (802*a*, 802*b*: see FIG. 17), and a number of the third objects is a number corresponding to a difference obtained by subtracting the first predetermined number (for example, 16) from a third predetermined number (here, 40) which is a maximum number of pieces of software which can be activated by the activation control program (240). Therefore, it is possible to easily recognize, in a visual manner, the number (here, (the third predetermined number)−(the first predetermined number)) of pieces of software which can be added.

An activation control program according to a fourteenth aspect is the activation control program based on the thirteenth aspect, and the computer (21) is caused to further function as number increasing means (216) for determining whether or not predetermined requirements are satisfied, and increasing the third predetermined number (here, 39) by a predetermined amount (here, one) when it is determined that the predetermined requirements are satisfied. Therefore, for example, software which is needed for a predetermined usage is preinstalled, and when a user needs the software (when it is determined that predetermined requirements are satisfied), it is possible to visually recognize the software, thereby enabling improvement of usability.

An activation control program according to a fifteenth aspect is the activation control program based on the fourteenth aspect, and the computer (21) is connected to a predetermined communication apparatus (4) so as to enable communication therebetween, and the computer (21) is caused to further function as communication enablement determination means (211) for determining whether or not the communication with the predetermined communication apparatus (4) is enabled. Further, the predetermined requirements are requirements that the communication enablement determination means (211) determines that the communication with the predetermined communication apparatus (4) is enabled, and an operation input for starting the communication with the predetermined communication apparatus (4) is received. Therefore, when the communication with the predetermined communication apparatus (4) is started, the first object (871c: see FIG. 24) and the second object (872b: see FIG. 24) each corresponding to communication software for executing the communication with the predetermined communication apparatus (4) can be visually recognized, thereby enabling improvement of usability.

The activation control program according to a sixteenth aspect is the activation control program based on the first aspect, and the display change means (214, 217) receives an operation input from outside by displaying the position designation image (842b: see FIG. 21) in the second display area (842: see FIG. 21), and displays, based on the operation input having been received, a first object (841c: see FIG. 21) which corresponds to the subject software and is among the first objects corresponding to the first predetermined number of pieces of software, in the first display area (841: see FIG. 21). Therefore, it is possible to easily activate the subject software.

The activation control program according to a seventeenth aspect is the activation control program based on the first aspect, and the second display control means (219) displays an image, in a visual manner, indicating a position, of the software selected as software to be activated, in the order set for the first predetermined number of pieces of software, before the activation execution means (220) activates the software selected as the software to be activated. Therefore, it is possible to easily recognize, in a visual manner, the position-in-order for the software selected by the activation execution means (220).

The activation control program according to an eighteenth aspect is the activation control program based on the first aspect, and the second display control means (219) displays an image (803: see FIG. 17), in a visual manner, indicating positions, of software corresponding to the second predetermined number (here, 3) of first objects, respectively, displayed by the first display control means (218), in the order set for the first predetermined number of pieces of software. Therefore, it is possible to easily recognize, in a visual manner, the order of the second predetermined number of first objects displayed by the first display control means (218).

The activation control program according to a nineteenth aspect is the activation control program based on the first aspect, and, when the computer (21) performs a predetermined process, the second display control means (219) sets, as the subject software, software corresponding to the predetermined process, and displays the position designation image at a position which corresponds to a position, of the software corresponding to the predetermined process, in the order set for the first predetermined number of pieces of software. Therefore, it is possible to easily activate software associated with a predetermined process (for example, detection as to whether or not the storage medium (17) is mounted) performed by the computer (21).

The activation control program according to a twentieth aspect is the activation control program based on the eighteenth aspect, and the computer (21) is provided in a housing (13) to which a storage medium (17) storing software is detachably mounted. Further, the activation control program (240) is operable to activate first software corresponding to the software stored in the storage medium (17), and second software corresponding to software stored in a non-volatile storage medium (24a) in the housing, and the first software and the second software form the first predetermined number of pieces of software. Furthermore, the second display control means (219) sets the first software as the subject software, and displays the position designation image at a position corresponding to a position of the first software in the order set for the first predetermined number of pieces of software. Therefore, it is possible to easily activate the software (=the first software) stored in the storage medium (17).

The activation control program according to a twenty-first aspect is the activation control program based on the twentieth aspect, and the computer (21) is caused to further function as medium detection means (213) for detecting whether or not the storage medium (17) is mounted to the housing (13). Further, the second display control means (219) displays the position designation image (852b: see FIG. 22) when the medium detection means (213) detects that the storage medium (17) is mounted. Therefore, it is possible to easily activate the software (=the first software) stored in the storage medium (17).

The activation control program according to a twenty-second aspect is the activation control program based on the twentieth aspect, and the second display control means (219) displays, in the second display area (802: see FIG. 17), second objects (802a, 802b: see FIG. 17) which are each smaller than the first objects, and correspond to the first predetermined number of pieces of software, respectively. Further, the second display control means (219) displays, as the position designation image, a second object (802b: see FIG. 17) which corresponds to the subject software and is among the second objects corresponding to the first predetermined number of pieces of software so as to be distinguishable from the second objects (802a: see FIG. 17) other than the second object corresponding to the subject software. Therefore, it is possible to easily recognize, in a visual manner, the position-in-order for the subject software based on the second object displayed in the second display area.

The activation control program according to a twenty-third aspect is the activation control program based on the twenty-second aspect, and the second display control means (219) displays a second object (802a: see FIG. 17) corresponding to the second software. Further, the second display control means (219) displays, as the position designation image, a second object (802b: see FIG. 17) which corresponds to the first software and is distinguishable from the second object corresponding to the second software. Therefore, it is possible to easily recognize, in a visual manner, a position-in-order for the first software (=the software stored in the storage medium (17) corresponding to the subject software, based on the second object displayed in the second display area.

The activation control program according to a twenty-fourth aspect is the activation control program based on the twenty-second aspect, and an order of the first software for a case where the storage medium (17) is mounted is set regardless of whether or not the storage medium (17) is mounted in the housing (13). Further, the second display control means (219) displays, as the position designation image, a second object (852b: see FIG. 22) corresponding to the first software, at a position based on positions in the order for the first software when the medium detection means (213) detects that the storage medium (17) is mounted. Furthermore, third objects (832c: see FIG. 20) which correspond to the first software and are distinguishable from the second object are displayed at positions corresponding to positions in the order for the first software when the medium detection means (213) does not detect that the storage medium (17) is mounted. Therefore, it is possible to easily determine, in a visual manner, whether or not the storage medium storing the first software (=the software stored in the storage medium) corresponding to the subject software is mounted.

The third object is an object which does not correspond to any of the first predetermined number (for example, 16) of pieces of software, and, in an example shown in FIG. 20, the third object corresponds to objects (832a) which are displayed, when the memory card 17 (see FIG. 2) is not mounted, at positions (the third position from the left) corresponding to positions-in-order for card programs (programs stored in the memory card 17) to be displayed when the memory card 17 is mounted.

Moreover, the "order" is set for the first predetermined number (for example, 16) of pieces of software. Based on this, determined are the positions in display order at which the first objects corresponding to the respective software are displayed in the first display area. However, as described below, when the memory card 17 is detachably mounted to the information processing apparatus 10, and card programs stored in the memory card 17 are able to be activated, the order of the card programs is set as follows.

Specifically, in a state where no card is mounted, the position-in-order for each software in the memory card 17 is to be displayed when the memory card 17 is mounted is previously set. When the memory card 17 is mounted, each software in the memory card 17 is assigned to the position-in-order having been previously set. Thus, when a memory card 17 is mounted, each software in the memory card 17 is assigned to the position-in-order having been previously set regardless of what the software is. For example, a card program A is stored in a memory card A, and a card program B is stored in a memory card B. When the position-in-order, "3", is previously set to both the card programs A and B, the second object corresponding to the card program A is displayed at a position corresponding to the position-in-order, "3", when the memory card A is mounted, and the second object corresponding to the card program B is displayed at a position corresponding to the position-in-order, "3", when the memory card B is mounted. When the memory card 17 is not mounted, a predetermined image may be displayed in the second display area at a position corresponding to the position-in-order, "3". The "predetermined image" corresponds to the third object (832a: see FIG. 20) described above.

The activation control program according to a twenty-fifth aspect is the activation control program based on the twenty-second aspect, and an order of the first software for a case where the storage medium (17) is mounted is set regardless of whether or not the storage medium (17) is mounted in the housing (13). Further, the second display control means (219) displays second objects (832a, 832b: see FIG. 20) such that a portion of the second objects correspond to the first software, and a remaining portion of the second objects correspond to the second software. Furthermore, an image (852b: see FIG. 22) obtained by changing display state of the second objects corresponding to the first software is displayed as the position designation image when the medium detection means (213) detects that the storage medium (17) is mounted. Therefore, it is possible to easily determine, in a visual manner, whether or not the storage medium storing the first software (=the software stored in the storage medium) corresponding to the subject software is mounted.

The activation control program according to a twenty-sixth aspect is the activation control program based on the twenty-first aspect, and the medium detection means (213) detects whether or not the storage medium (17) is mounted in the housing (13) after the predetermined information processing apparatus (10) is powered on. Therefore, it is possible to easily activate the software stored in the storage medium (17).

The activation control program according to a twenty-seventh aspect is the activation control program based on the first aspect, and the computer (21) is connected to another computer (4) so as to enable communication therebetween, and the computer (21) is caused to further function as communication enablement determination means (211) for determining whether or not communication with the another computer (4) is enabled. Further, the second display control means (219) sets, as the subject software, software for causing the computer (21) to execute the communication with the another computer 4, among the first predetermined number of pieces of software, and displays the position designation image (872b: see FIG. 24) at a position corresponding to a position of the subject software in the order. Therefore, it is possible to easily activate communication software corresponding to the software for executing the communication with the another computer (4).

The activation control program according to a twenty-eighth aspect is the activation control program based on the first aspect, and the computer (21) is connected to another computer (6) so as to enable communication therebetween, and the another computer is capable of transmitting software, and the computer (21) is caused to further function as acquisition determination means (212) for determining whether or not the software is acquired from the another computer (6). Further, the second display control means (219) sets, as the subject software, the software determined, by the acquisition determination means (212), as having been acquired from the another computer (6), among the first predetermined number of pieces of software, and displays the position designation image (802b: see FIG. 17) at a position based on positions in the order set for the first predetermined number of pieces of software. Therefore, it is possible to easily activate the software acquired from the another computer (6).

The activation control program according to a twenty-ninth aspect is the activation control program based on the first aspect, and the computer (21) is caused to further function as order change means (215) for receiving an operation input from outside, and changing, based on the operation input having been received, a display order of the first objects corresponding to the first predetermined number of pieces of software. Therefore, it is possible to change the order of the first objects as desired by a user.

The activation control program according to a thirtieth aspect is the activation control program based on the first aspect, and at least one of the display change means (214, 217) and the activation execution means (220) receives an operation input through a touch panel (15) which is integrated with the monitor (12). Therefore, it is possible to improve operability.

The activation control program according to a thirty-first aspect is the activation control program based on the first aspect, and the computer (21) is caused to further function as object storage means (241, 242) for storing order information representing an order and first object information both of which are associated with the first predetermined number of pieces of software. Further, the first display control means (218) reads, from the object storage means (241, 242), the first object information determined to be displayed in the first display area by means of the display change means (214, 217), and displays an image represented by the first object information. Therefore, the first object designated by the display change means (214, 217) can be displayed in the first display area by using a simplified configuration.

The activation control program according to a thirty-second aspect is the activation control program based on the first aspect, and the first objects are associated with positions, respectively, in the second display area (832: see FIG. 20), based on the order, and the display change means (214, 217) receives an operation input, from outside, on the second display area (832: see FIG. 20), and displays, in the first display area (841: see FIG. 21), one of the first objects (841c: see FIG. 21) based on the operation input having been received. Therefore, it is possible to easily display the first object corresponding to the software desired to be activated, thereby enabling desired software to be easily activated.

The activation control program according to a thirty-third aspect is the activation control program based on the thirty-second aspect, and the display change means (214, 217) receives a position input from outside on the second display area (832: see FIG. 20), and displays, in the first display area (841: see FIG. 21), one of the first objects (841c: see FIG. 21) based on the position input having been received. Therefore, it is possible to display, with enhanced easiness, the first object corresponding to the software desired to be activated.

The activation control program according to a thirty-fourth aspect is the activation control program based on the first aspect, and the second display control means (219) displays an order of a fourth predetermined number of pieces of software by using a display order of second objects corresponding to the fourth predetermined number of pieces of software, respectively, and the fourth predetermined number of pieces of software is greater than or equal to the second predetermined number of pieces of software, and is smaller than or equal to the first predetermined number of pieces of software, and the fourth predetermined number of pieces of software includes the second predetermined number of pieces of software included in the first predetermined number of pieces of software. Further, the display change means (214, 217) receives an operation input from outside based on the fourth predetermined number of the second objects (832a, 832b: see FIG. 20) displayed in the second display area (832: see FIG. 20), and displays, in the first display area (841: see FIG. 21), the second predetermined number of first objects (841b, 841c, 841d: see FIG. 21) including a first object of software corresponding to one of the second objects, which is designated through the operation input having been received. Therefore, it is possible to easily display the first object corresponding to software desired to be activated, thereby enabling easy activation of the desired software.

An activation control program according to a thirty-fifth aspect is the activation control program based on the first aspect, and the predetermined information processing apparatus is provided in a game apparatus (10), and the software is application software for executing a game. Therefore, it is possible to realize a game apparatus capable of easily selecting and activating application software.

An activation control apparatus (21, 24, 24a) according to the present invention is an activation control apparatus (21) for selecting and activating one of a first predetermined number (for example, 40) of pieces of software, and the first predetermined number of pieces of software is greater than or equal to two.

Further, the activation control apparatus (21) comprises first display control means (218), second display control means (219), display change means (214, 217), and activation execution means (220). The first display control means (218) selectively displays, in a first display area (801: see FIG. 17) on a monitor (12), a second predetermined number (here, 3) of first objects (801b, 801c, 801d: see FIG. 17) among first objects corresponding to the first predetermined number (for example, 16) of pieces of software, respectively, and for which an order is set, and the second predetermined number is smaller than the first predetermined number.

Further, the second display control means (219) displays, in a second display area (802: see FIG. 17) different from the first display area (801: see FIG. 17) on the monitor (12), a position designation image (802b: see FIG. 17) representing subject software among the first predetermined number (for example, 16) of pieces of software, at a position based on positions in the order set for the first predetermined number of pieces of software.

Furthermore, the display change means (214, 217) receives an operation input from outside, and changes, based on the operation input having been received, the second predetermined number of first objects (801b, 801c, 801d: see FIG. 17) to be displayed in the first display area (801: see FIG. 17). In addition, the activation execution means (220) receives an operation input from outside, and selects, based on the operation input having been received, one of the second predetermined number of first objects (801b, 801c, 801d: see FIG. 17) displayed in the first display area (801: see FIG. 17), and activates software corresponding to the selected one of the second predetermined number of first objects.

The activation control program (240) and the activation control apparatus (21, 24, 24a) according to the present invention display the position designation image (802b: see FIG. 17) at a position corresponding to a position, of the subject software, in the order of the first predetermined number (for example, 16) of pieces of software, and therefore it is possible to easily select and activate desired software (here, the subject software).

In other words, based on the position designation image (802b: see FIG. 17), the second predetermined number (here, 3) of first objects (801b, 801c, 801d: see FIG. 17) to be displayed in the first display area may be determined, and when one of the second predetermined number of first objects (801b, 801c, 801d: see FIG. 17) displayed in the first display area (801: see FIG. 17) is selected, the subject software is able to be activated, thereby enabling easy selection and activation of the subject software.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 1 is an external view of a game apparatus according to an embodiment;

FIG. 5 shows a table indicating an example of link information stored in a link information storage section;

FIG. 6 is a diagram illustrating an exemplary manner for communicating with a shop server;

FIG. 7 is a diagram illustrating an exemplary manner for communicating with a server device through the Internet;

FIG. 10 is a flow chart showing in detail an example of an activation execution process performed in step S105 shown in the flow chart of FIG. 8;

DESCRIPTION OF THE PREFERRED EMBODIMENTS

Figure 2:
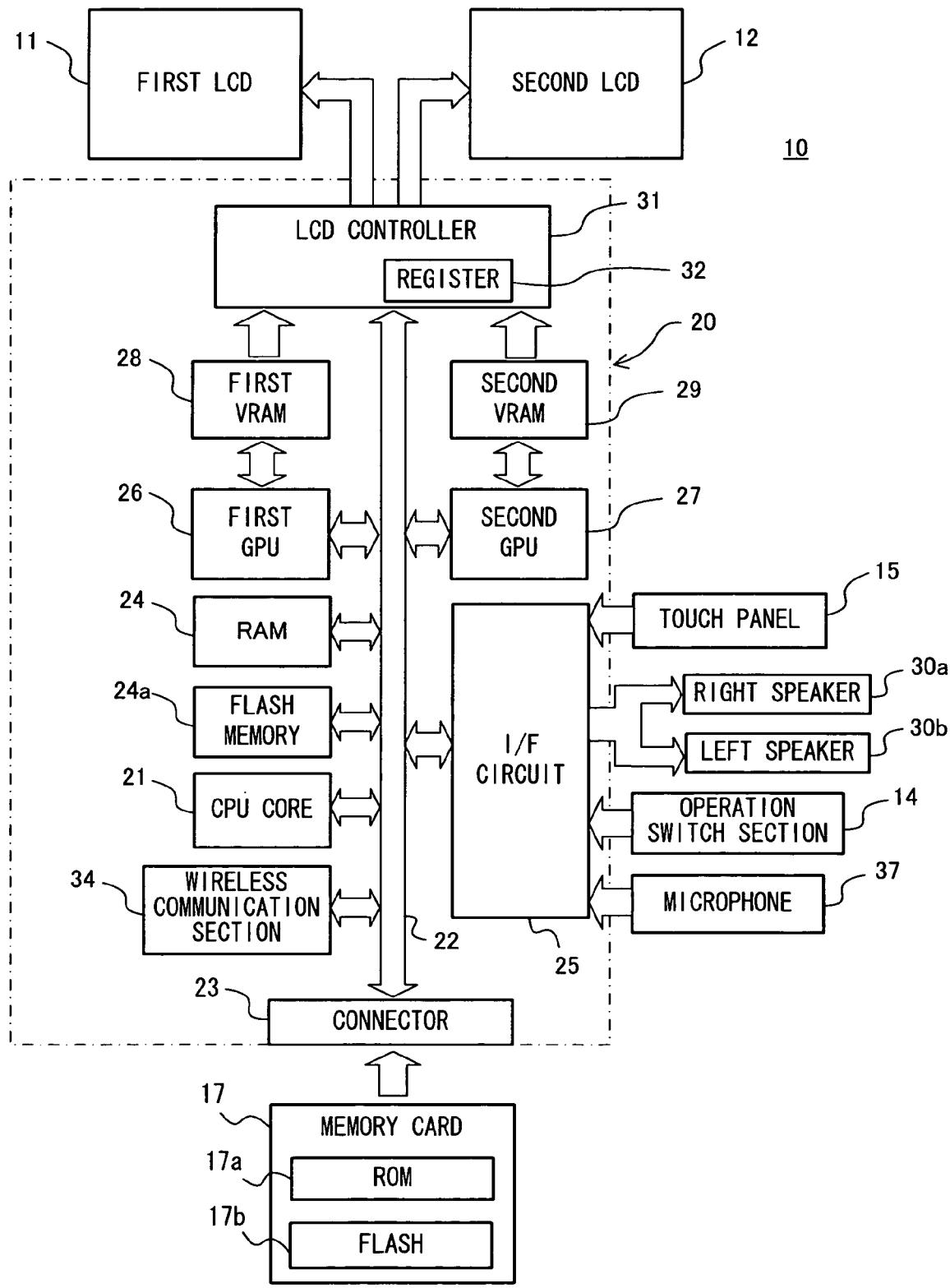
FIG. 2 is a diagram illustrating an internal structure of the game apparatus.

Hereinafter, an embodiment will be described. FIG. 1 is an external view of a game apparatus according to an embodiment. The present embodiment is applicable not only to a hand-held game apparatus but also to a stationary game apparatus. Further, the present embodiment is applicable not only to a game apparatus but also to an information processing apparatus (for example, personal computer, a mobile telephone, a television receiver, a DVD (Digital Versatile Disc) player, and the like) having a function for selecting and executing software such as an application program.

In FIG. 1, the game apparatus 10 (corresponding to an information processing apparatus) includes a first LCD (Liquid Crystal Display) 11 and a second LCD 12. A housing 13 (corresponding to a housing) includes an upper housing 13a and a lower housing 13b. The first LCD 11 is accommodated in the upper housing 13a, and the second LCD 12 (corresponding to a monitor) is accommodated in the lower housing 13b. Each of the first LCD 11 and the second LCD 12 has a resolution of 256 dots×192 dots. Although in the present embodiment an LCD is used as a display device, another type of display device such as a display device using, for example, an EL (Electro Luminescence) may be used as the display device. Further, the resolution may be optionally selected.

In the upper housing 13a, sound holes 18a and 18b for outputting a sound from a pair of speakers (30a and 30b, respectively, shown in FIG. 2) described below are formed. A microphone hole 33 is provided at a hinge portion for connecting between the upper housing 13a and the lower housing 13b in an openable and closable manner.

On the lower housing 13b, a cross switch 14a, a start switch 14b, a select switch 14c, an A button 14d, a B button 14e, an X button 14f, and a Y button 14g are provided as input devices. Further, on a side surface of the lower housing 13b, an L button and an R button, which are not shown, are provided. Further, as another input device, a touch panel 15 is provided on a screen of the second LCD 12. On side surfaces of the lower housing 13b, a power switch 19, an insertion opening 35 (indicated by a dashed-dotted line shown in FIG. 1) for inserting a memory card 17, and an insertion opening 36 (indicated by a dashed-line shown in FIG. 1) for accommodating a stick 16 are provided.

The touch panel 15 may be of any type including, for example, a resistive film type, an optical type (infrared type), or a capacitive coupling type. The touch panel 15 may be operated by using a finger or the like instead of the stick 16. In the present embodiment, the touch panel 15 also has a resolution (detection accuracy) of 256 dots×192 dots so as to correspond to the resolution of the second LCD 12. However, the resolution of the touch panel 15 may not necessarily be the same as the resolution of the second LCD 12.

The memory card 17 (corresponding to a storage medium) includes a ROM 17a for storing a game program, and a RAM 17b for storing backup data in a rewritable manner, and the memory card 17 is detachably mounted in the insertion opening 35 provided in the lower housing 13b. In the deepest portion of the insertion opening 35, a first connector 23a (see FIG. 2) for connecting with a connector provided at the top edge of the memory card 17 in the inserting direction is provided so as to conduct electricity therebetween, which is not shown in FIG. 1. When the memory card 17 is inserted in the insertion opening 35, the connectors are connected to each other so as to conduct electricity therebetween, so that a CPU core 21 (see FIG. 2) of the game apparatus 10 is allowed to access the memory card 17.

Next, an internal structure of the game apparatus 10 will be described with reference to FIG. 2. FIG. 2 is a block diagram illustrating an internal structure of the game apparatus 10. In FIG. 2, the CPU core 21 is mounted in an electronic circuit substrate 20 accommodated in the housing 13. The CPU core 21 is connected, through a bus 22, to the connector 23, an input/output interface circuit (abbreviated as an I/F circuit in the drawing) 25, a first GPU (Graphics Processing Unit) 26, a second GPU 27, a RAM 24, a flash memory 24a, an LCD controller 31, and a wireless communication section 34. The memory card 17 is detachably connected to the connector 23. The I/F circuit 25 is connected to the touch panel 15, the right speaker 30a, the left speaker 30b, an operation switch section 14 including, for example, the cross switch 14a and the A button 14d shown in FIG. 1, and a microphone 37. The right speaker 30a and the left speaker 30b are provided below the sound holes 18a and 18b, respectively. The microphone 37 is provided below the microphone hole 33.

A first GPU 26 is connected to a first VRAM (Video RAM) 28, and a second GPU 27 is connected to a second VRAM 29. The first GPU 26 generates a first display image in accordance with an instruction from the CPU core 21, and writes image information in the first VRAM 28. Similarly, the second GPU 27 generates a second display image in accordance with an instruction from the CPU core 21, and writes image information in the second VRAM 29. The first VRAM 28 and the second VRAM 29 are connected to the LCD controller 31.

The LCD controller 31 includes a register 32. The register 32 stores a value, "0" or "1", in accordance with an instruction from the CPU core 21. When the value stored in the register 32 is "0", the LCD controller 31 outputs, to the first LCD 11, the first display image stored in the first VRAM 28, and outputs, to the second LCD 12, the second display image stored in the second VRAM 29. On the other hand, when the value stored in the register 32 is "1", the LCD controller 31 outputs, to the second LCD 12, the first display image stored in the first VRAM 28, and outputs, to the first LCD 11, the second display image stored in the second VRAM 29.

A wireless communication section 34 has a function for performing data transmission to and data reception from a wireless communication section of another game apparatus, an antenna of a server device, or the like (see FIG. 6). Further, the game apparatus 10 may be connected to a wide-area network such as the Internet through the wireless communication section 34, and may also communicate with another game apparatus, a server device, and the like through the network (see FIG. 7).

The flash memory 24a (corresponding to a portion of an activation control apparatus) is, for example, a NAND flash memory, and stores an activation control program of the present invention, image information representing a first object, a second object, and a third object, and game program information representing a plurality of game programs. When the activation control program is to be executed by the CPU core 21, the activation control program stored in the flash memory 24a is read and stored in the RAM 24, and thereafter the activation control program is executed by the CPU core 21. Further, when the game apparatus 10 is powered on and started up, the image information stored in the flash memory 24a is read and stored in the RAM 24. Further, when a game program is to be executed, a game program included in the plurality of game programs represented by the game program information stored in the flash memory 24a is read and stored in the RAM 24, and thereafter the game program is executed by the CPU core 21. The game program downloaded from the server device 6 (see FIG. 7) through the Internet is stored in the flash memory 24a. Further, the flash memory 24a is capable of storing up to 40 game programs or the like (see FIG. 5).

Figure 3:
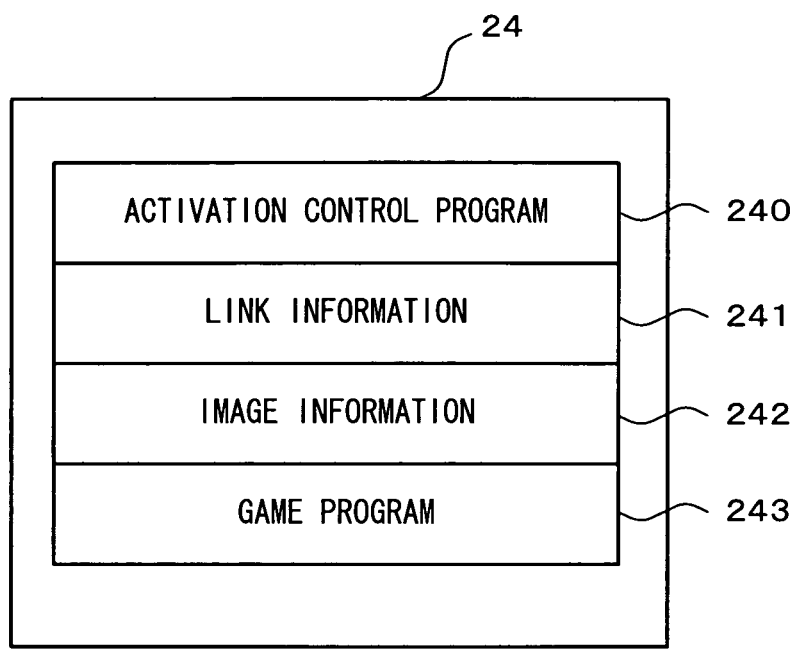
FIG. 3 shows a memory map of a RAM.

FIG. 3 shows a memory map of the RAM 24. The RAM 24 stores the activation control program 240 of the present invention, link information, and the image information. Further, the game program information is read from the flash memory 24a and stored in the RAM 24. The link information, the image information, and the game program information are stored in a link information storage section 241, an image storage section 242, and a software storage section 243, respectively (see FIG. 4). The link information is used for associating each game program stored in the flash memory 24a, with the image information, position-in-display-order number information, and the like. The image information represents a first object, a second object, and a third object, which will be described below. The game program information represents, for example, a game program downloaded through the Internet or the like, and the game program information is read from the flash memory 24a and stored as described above.

In the present embodiment, a "computer" is the CPU core 21 provided in the game apparatus 10. However, the "computer" may be, for example, a CPU or an MPU provided in another device (for example, a mobile telephone, a PDA (Personal Digital Assistant), a personal computer, or the like). Further, in the present embodiment, "software" is a game program. However, the "software" may be another type of software (for example, application program or the like).

Figure 4:
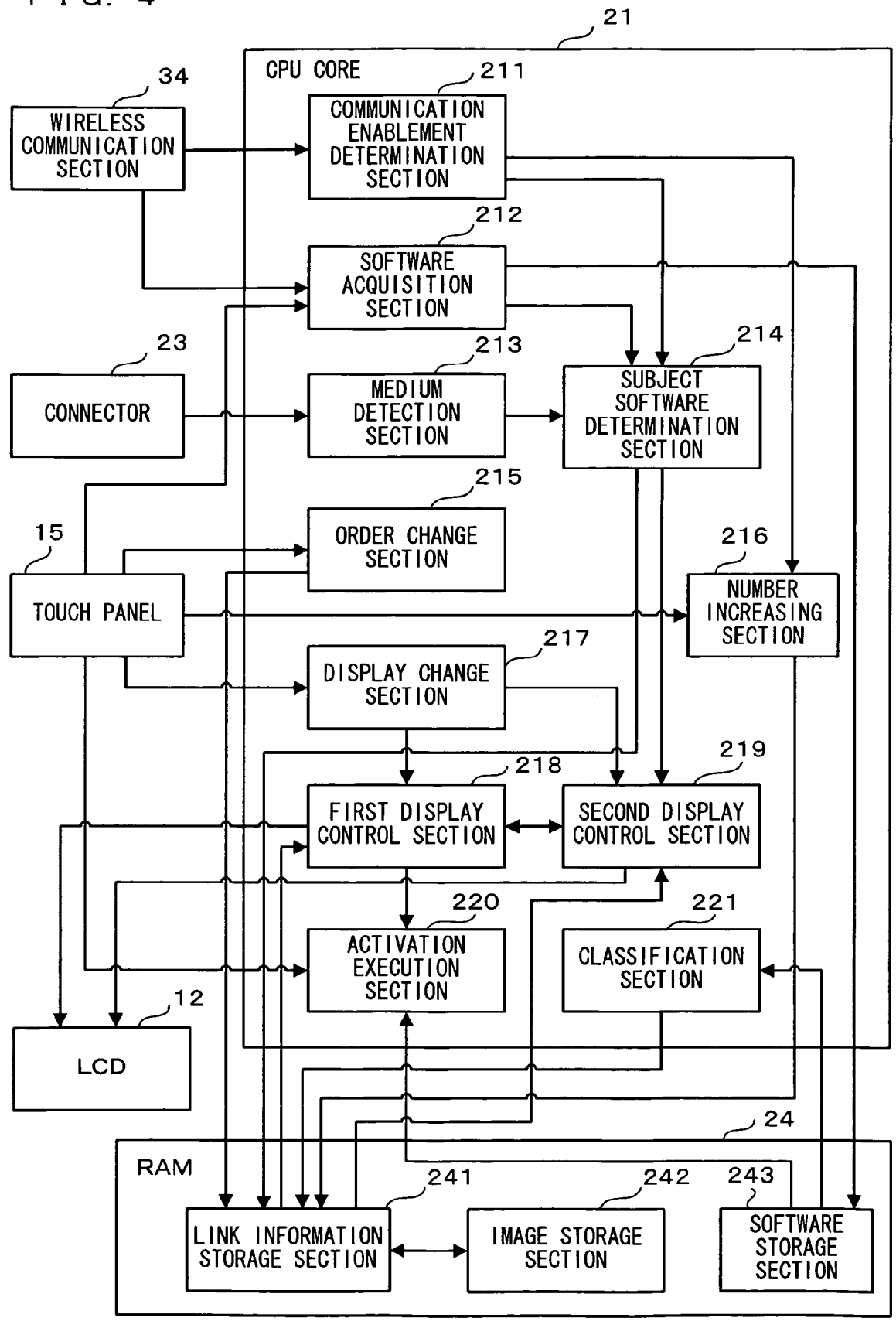
FIG. 4 is a block diagram illustrating an exemplary functional structure of an activation control apparatus according to the present embodiment.

FIG. 4 is a block diagram illustrating an exemplary functional structure of an activation control apparatus according to the present invention. The CPU core 21 (corresponding to a portion of the activation control apparatus) functionally includes: a communication enablement determination section 211; a software acquisition section 212; a medium detection section 213; a subject software determination section 214; an order change section 215; a number increasing section 216; a display change section 217; a first display control section 218; a second display control section 219; an activation execution section 220; and a classification section 221. The RAM 24 (corresponding to a portion of the activation control apparatus) functionally includes: the link information storage section 241; the image storage section 242; and the software storage section 243.

The CPU core 21 functions, by executing a control program previously stored in the RAM 24 or the like, as functional sections corresponding to the communication enablement determination section 211, the software acquisition section 212, the medium detection section 213, the subject software determination section 214, the order change section 215, the number increasing section 216, the display change section 217, the first display control section 218, the second display control section 219, the activation execution section 220, the classification section 221, and the like, and causes the RAM 24 to function as functional sections corresponding to the link information storage section 241, the image storage sections 242, 243, and the like.

The link information storage section 241 (corresponding to a portion of object storage means) is a functional section for storing the link information used for associating each game program stored in the flash memory 24a (or the software storage section 243) with the image information, the position-in-display-order number information, and the like.

FIG. 5 shows a table indicating an example of the link information stored in the link information storage section 241. As shown in FIG. 5, the position-in-display-order number information is indicated in the leftmost column, and application ID information, first image ID information, second image ID information, display position flag information, non-open state flag information, blink flag information are indicated in order, respectively, starting from the left end, so as to be associated with the position-in-display-order number information.

The position-in-display-order number information defines a position-in-order for each first object displayed in a first display area 801 (see FIG. 17) described below. The application ID information is identification information of each game program stored in the flash memory 24a (or the software storage section 243). The first image ID information is identification information of an image to be displayed as the first object. An icon image to be displayed as the first object is determined, among images stored in the image storage section 242, based on the first image ID information. The second image ID information is identification information of an image to be displayed as the second object (or the third object). The display position flag information is flag information for indicating the first object (the first object 801c shown in FIG. 17) to be displayed at the center of the first display area 801 (see FIG. 17) described below.

The non-open state flag information is flag information for indicating a game program having been downloaded through the Internet, and for indicating a predetermined specific image (a specific object 801d shown in FIG. 17) which is to be displayed, in the first display area 801 (see FIG. 17) described below, as the first object corresponding to the game program having been downloaded, until an opening process (process step of step S309 shown in a flow chart of FIG. 10) described below is performed. The blink flag information is flag information for indicating the second object (see the second object 802b shown in FIG. 17) which is to be displayed in a second display area 802 (see FIG. 17) described below so as to be blinked.

In the present embodiment, subject software is a "program (hereinafter, referred to as a downloaded program) having been downloaded through the Internet". Only when the downloaded program satisfies predetermined requirements (display state change requirements) (in the present embodiment, only when the downloaded program is not opened), the second object corresponding to the downloaded program which is not opened is displayed in a manner different from other programs (for example, the unopened downloaded program is blinked or highlighted when displayed). This is determined based on the non-open state flag information described above.

In another example, the subject software may be "software for executing a process using a communication function of the wireless communication section". In this case, the second object corresponding to the subject software may be displayed in the different manner when the display state change requirements, as described above, that "the wireless communication section is able to communicate with another communication apparatus (the wireless communication section is within a range in which the communication with the another communication apparatus is enabled, or a beacon signal is received from the another communication apparatus)" are satisfied. In this case, the subject software may be "specific software for executing the process using the communication function of the wireless communication section (for example, software which is identified by its title name, its title ID, and/or the like), or each software may include flag information indicating "whether or not the process using the communication function of the wireless communication section is to be executed" so as to determine whether or not each software is the subject software, based on the flag information.

The link information storage section 241 includes, for each item, a "card application identification flag", which is not shown. This flag indicates whether or not software of each item corresponds to card software stored in the memory card 17. The "card application identification flag" of the item(s) corresponding to the card software is set to "1", whereas the "card application identification information flags" of other items are set to "0". As described above, when a card is not mounted, a position-in-order at which each software stored in the card is to be displayed in a case where the card is mounted is previously set. Therefore, also when the card is not mounted, the link information storage section 241 stores information for the card software in an item corresponding to the position-in-order having been previously set.

Figure 20:
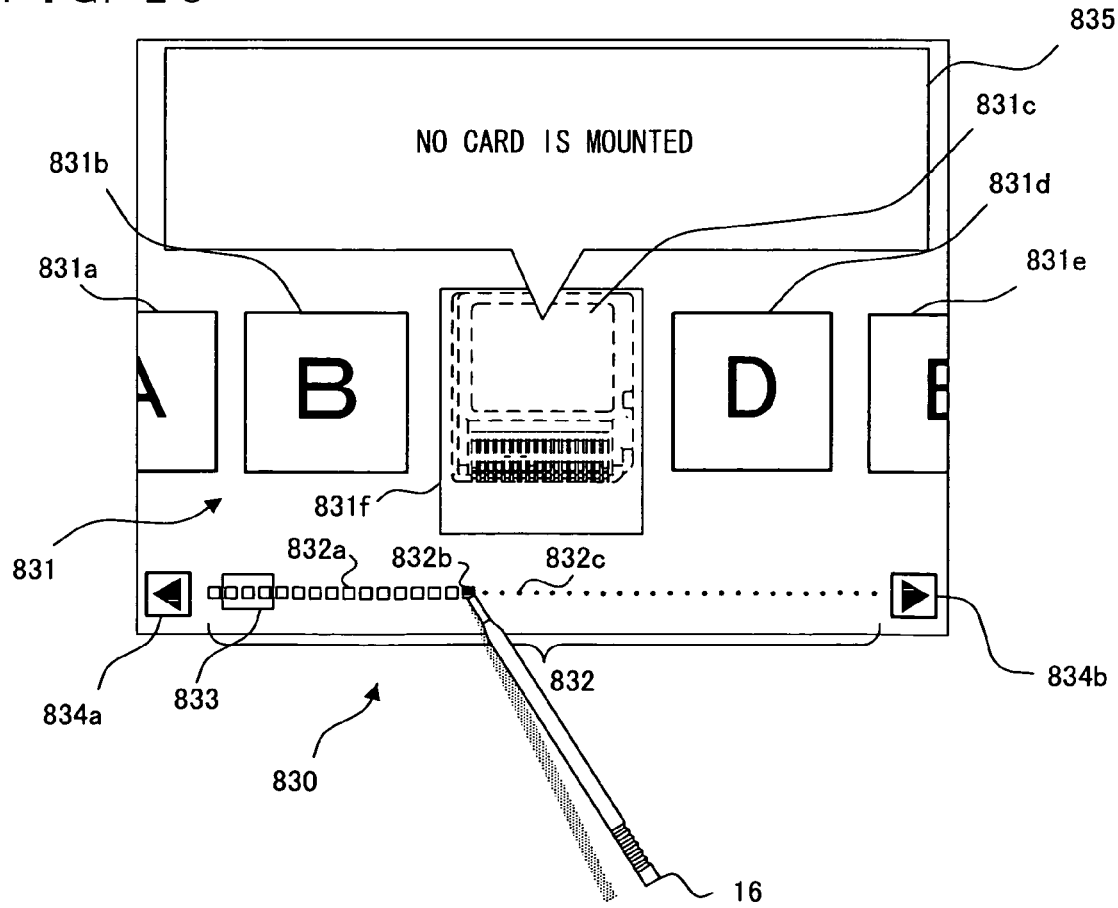
FIG. 20 is a diagram illustrating an exemplary operation reception screen displayed on the second LCD before display state is updated in step S405 (or step S813 shown in the flow chart of FIG. 15) shown in the flow chart of FIG. 11.

Specifically, when the memory card 17 is not mounted, an ID of an image corresponding to the first object 831c shown in FIG. 20 is registered as "the first image ID", an ID of an image corresponding to the second object 832a shown in FIG. 20 is registered as "the second image ID", and the card application identification flag is set to "1" in the item corresponding to the card software. When the memory card 17 is mounted, the application ID for the software stored in the memory card 17 is registered in an area for the "application ID", the first image ID is registered in an area for the "first image ID", and the ID of the image corresponding to the second object 832a is registered in an area for the "second image ID", so as to be associated with the item corresponding to the position-in-order having been previously set. The card application identification flag remains set to "1".

Returning to FIG. 4, the functional structure of the activation control apparatus (the CPU core 21, the RAM 24, the flash memory 24a) will be described. The image storage section 242 (corresponding to a portion of object storage means) is a functional section for storing image information corresponding to the first object so as to be associated with the first image ID information stored in the link information storage section 241, and for storing image information corresponding to the second object (and the third object) so as to be associated with the second image ID information stored in the link information storage section 241. The software storage section 243 is a functional section for reading, from the flash memory 24a, a preinstalled game program which is stored in the flash memory 24a, a game program having been downloaded from the Internet, and the like, and storing the read game program and the like.

The communication enablement determination section 211 (corresponding to a portion of enablement determination means, and communication enablement determination means) is a functional section for determining whether or not communication with a predetermined communication apparatus and another computer through the wireless communication section 34 is enabled. Two manners in which the communication with another computer through the wireless communication section 34 is made will be described with reference to FIG. 6 and FIG. 7.

FIG. 6 is a diagram illustrating an exemplary manner in which communication with a shop server is made. The shop server 4 is connected to the game apparatus 10 (the wireless communication section 34) through an antenna 41 so as to enable wireless communication therebetween. When a user of the game apparatus 10 enters a shop, such as a restaurant and a home electronics mass retailer shop, in which the shop server 4 is provided, with the game apparatus 10 held by the user, the antenna 41 is able to transmit to and receive from the game apparatus 10 (=the game apparatus 10 carried by the user into the shop) in the shop, a wireless communication signal. The shop server 4 (corresponding to a predetermined communication apparatus) transmits, to the game apparatus 10, various information such as bargain information of a shop in which the shop server 4 is mounted, and enables a predetermined mini game or the like to be executed. The game program for executing the mini game or the like may be preinstalled in the flash memory 24a of the game apparatus 10, or may be transmitted from the shop server 4 by using wireless communication.

FIG. 7 is a diagram illustrating an exemplary manner in which communication with the server device through the Internet is made. The game apparatus 10 is connected to a base station 5 through an antenna 51 so as to enable communication therebetween. The base station 5 is connected to the server device 6 through the Internet 7 so as to enable communication therebetween. When a user of the game apparatus 10 enters, for example, a game arcade in which the base station 5 is provided, with the game apparatus 10 held by the user, the antenna 51 is able to transmit to and receive from the game apparatus 10 (=the game apparatus 10 carried by the user into the game arcade) in the game arcade, a wireless communication signal. The server device 6 (corresponding to another computer) transmits a game program, through the Internet 7 and the base station 5, in accordance with a request from the game apparatus 10. That is, when the user of the game apparatus 10 carries the game apparatus 10 into the game arcade or the like, a game program can be downloaded through the Internet 7 and the base station 5 from the server device 6.

Returning to FIG. 4 again, the functional structure of the activation control apparatus (the CPU core 21, the RAM 24, the flash memory 24a) will be described. The software acquisition section 212 (corresponding to acquisition determination means) is a functional section for receiving an operation input from a user through the touch panel 15 or the like, and downloading and acquiring a game program from the server device 6 through the Internet 7 and the base station 5 (see FIG. 7) based on the received operation input, and storing the game program in the flash memory 24a (or the software storage section 243), when the communication enablement determination section 211 determines that the communication with the server device 6 (see FIG. 7) is enabled. Further, the software acquisition section 212 determines whether or not a game program has been acquired from the server device 6.

Further, when a game program is acquired from the server device 6, the software acquisition section 212 writes, in the flash memory 24a, the application ID, the first image ID, the second image ID, the non-open state flag, and the blink flag so as to be associated with the acquired game program (see FIG. 5). Specifically, the software acquisition section 212 selects the position-in-display-order number which is smallest in the link information, as shown in FIG. 5, to which no application ID is assigned, and writes, as the item corresponding to the selected position-in-display-order number, the application ID, the first image ID, and the second image ID so as to be associated with the acquired game program. Thus, the information written in the flash memory 24a is transferred to the link information storage section 241 and used. Further, when the link information storage section 241 in the RAM 24 is updated through the activation control program 240 of the present invention, updated information is stored in the flash memory 24a, and transferred to the link information storage section 241 and used when the game apparatus 10 is started up for the immediately following time. Further, the software acquisition section 212 sets, to "1", the non-open state flag for the game program acquired from the server device 6.

The medium detection section 213 (corresponding to medium detection means) is a functional section for determining whether or not the memory card 17 is inserted into the insertion opening 35, and the connector 23 is connected to the memory card 17 so as to conduct electricity therebetween (=whether or not the memory card 17 is mounted to the game apparatus 10).

The subject software determination section 214 (corresponding to a portion of display change means, and a portion of enablement determination means) is a functional section for determining whether or not each of a first predetermined number (for example, 16) of game programs stored in the flash memory 24a satisfies requirements for the "subject software". The requirements for the "subject software" are as described above as examples of "the subject software". The requirements are, for example, requirements that the software has a "specific title" (which is determined based on the application ID), requirements that the software corresponds to a "program stored in the memory card" (determined based on the card identification flag when the medium detection section 213 determines that the memory card 17 is mounted), requirements that the software corresponds to a "program for executing communication process", or requirements that the software corresponds to an "unopened downloaded program" (determined based on the non-open state flag).

The subject software determination section 214 sets, to "1", the blink flag for the game program determined as the subject software such that the first object and the second object corresponding to the game program determined as the subject software are displayed so as to be blinked by means of the first display control section 218 and the second display control section 219, respectively (see FIG. 5).

The order change section 215 (corresponding to order change means) is a functional section for receiving an operation input from a user through the touch panel 15 or the like, and changing display order in which the first objects are to be displayed in the first display area 801 (see FIG. 17) based on the received operation input. Specifically, the order change section 215 receives an operation input from a user through the touch panel 15 or the like, and changes, based on the received operation input, the positions-in-display order by changing the position-in-display-order numbers, as shown in FIG. 5, each of which is associated with the application ID information, the first image information, and the like.

As described above, the display order in which the first objects are displayed in the first display area is changed based on the operation input, and therefore the display order in which the first objects are displayed can be changed as desired by a user.

The number increasing section 216 (corresponding to number increasing means) is a functional section for determining whether or not second predetermined requirements (corresponding to "predetermined requirements") are satisfied, and increasing, by a predetermined amount (1 in the present embodiment), a third predetermined number which is a maximum number of pieces of software which can be activated, when the second predetermined requirements are satisfied. Specifically, in the present embodiment, when the communication enablement determination section 211 determines that the communication with the shop server 4 (see FIG. 6) is enabled and an operation input for staring the communication with the shop server 4 is received for the first time (=when it is determined that the second requirements are satisfied), the number increasing section 216 increase, by one, the third predetermined number which is a maximum number of pieces of software which can be activated, that is, the third predetermined number is increased from 39 to 40.

That is, when the communication enablement determination section 211 determines that the communication with the shop server 4 (see FIG. 6) is enabled, and an operation input for starting the communication with the shop server 4 is received, the number increasing section 216 operates so as to cause the first display control section 218 and the second display control section 219 to visually display, in the first display area 801 and the second display area 802 (see FIG. 17), the first object and the second object, respectively, which correspond to the communication software (=functioning also as a game program) which executes the communication with the shop server 4, and which is previously stored in the flash memory 24*a* (or the software storage section 243).

As described above, software (the communication software in the present embodiment) necessary for a predetermined usage is preinstalled, and, when a user needs the software (when it is determined that the second requirements are satisfied), the software can be visually displayed, thereby improving usability. In the present embodiment, when the communication with the shop server 4 is started, the first object 871*c* (see FIG. 24) and the second object 872*b* (see FIG. 24) corresponding to the communication software for communicating with the shop server 4 can be visually displayed, thereby improving the usability.

Although in the present embodiment the number increasing section 216 increases the third predetermined number by one when the second requirements are satisfied, the number increasing section 216 may increase the third predetermined number by two or more when the second requirements are satisfied. For example, two or more kinds of requirements may be previously set as the second requirements, and each time one of the two or more kinds of requirements is satisfied, the number increasing section 216 may sequentially increase the third predetermined number by one. Alternatively, for example, when the second requirements are satisfied, the third predetermined number may be increased by two or more at once.

Further, in the present embodiment, the second requirements are requirements that the communication with the shop server 4 is enabled, and an operation input for starting the communication with the shop server 4 is received. However, the second requirements may be other than those. For example, the second requirements may be requirements that it is determined that a specific game program is acquired from the server device 6 (see FIG. 7).

The display change section 217 (corresponding to a portion of display change means) is a functional section for receiving, through the touch panel 15 or the like, an operation input made by a user by using the second object 802*b* (corresponding to a "position designation image") displayed in the second display area 802 (see FIG. 17), and for operating so as to cause the first display control section 218 to display the first object 801*c* in the first display area 801 (see FIG. 17), based on the received operation input.

Specifically, when received is an operation input for selecting the second object 832*b* (see FIG. 20) which is displayed by the second display control section 219 and which corresponds to a predetermined game program (in the present embodiment, when a position of the second object 832*b* on the touch panel 15 is touched by using the stick 16: see FIG. 20), the display change section 217 operates so as to cause the first display control section 218 to display, in the first display area 841 (see FIG. 21), the first object 841*c* (see FIG. 21) corresponding to the predetermined game program.

More specifically, when a position of the second object 832*b* on the touch panel 15 is touched by using the stick 16, the display change section 217 sets all the display position flags to "0" (=all the display position flags are cleared) in the link information shown in FIG. 5, and reads, from the link information, the position-in-display-order number for the second image ID corresponding to the second object 832*b*, and sets, to "1", the display position flag of an item of the position-in-display-order number having been read (=the display position flag is set).

As described above, the first object 841*c* (see FIG. 21) corresponding to a predetermined game program is displayed in the first display area 841 (see FIG. 21), and the predetermined game program can be easily activated through the first object 841*c* displayed. Further, an operation input is received through the touch panel 15, thereby improving operability.

When the second object corresponding to a predetermined game program is selected, the display change section 217 displays, in the first display area, the first object corresponding to the predetermined game program. In the present embodiment, when the second object 802*b* is selected, the display change section 217 displays, in the first display area, the first object corresponding to the selected second object.

Figure 17:
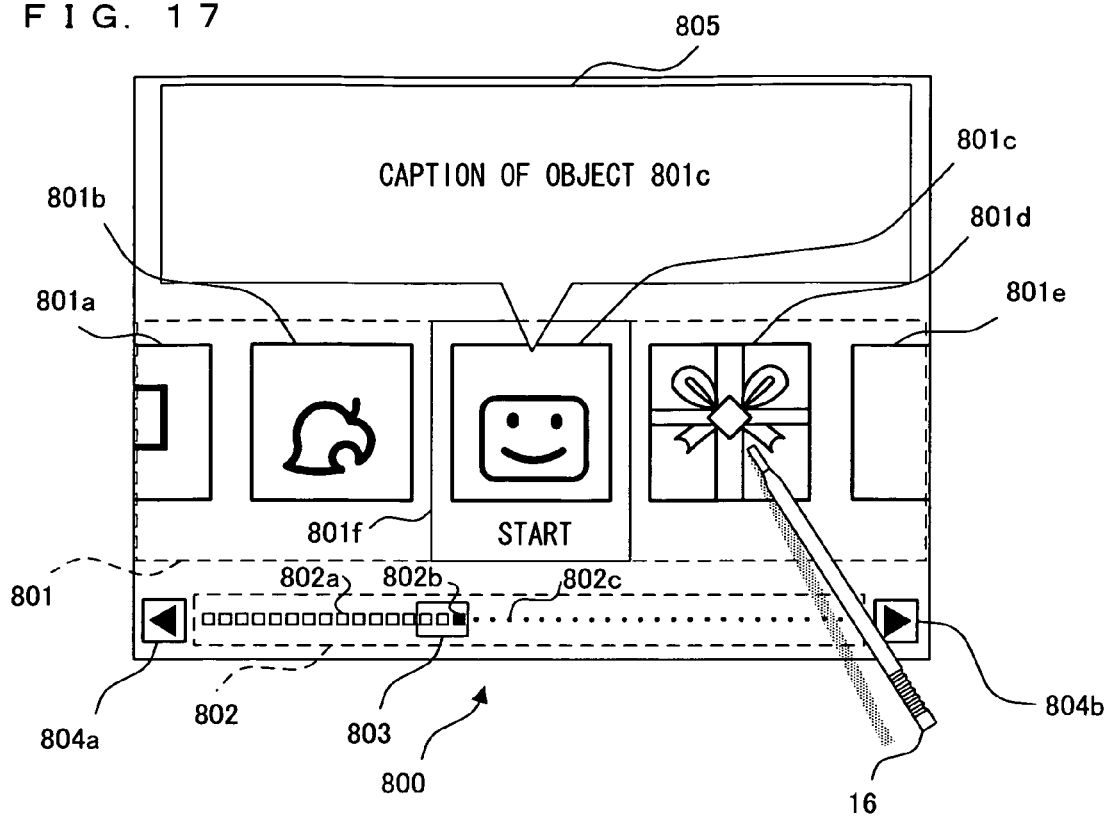
FIG. 17 is a diagram illustrating an exemplary operation reception screen displayed on a second LCD before display state is updated in step S319 shown in the flow chart of FIG. 10.

Further, when received is an operation input for scrolling the first display area 801 in which the first objects, 801*b*, 801*c*, and 801*d*, which correspond to a second predetermined number (3 in the present embodiment) of first objects, are displayed, by using scroll button 804*a* or 804*b* (see FIG. 17) (in the present embodiment, when a position of the scroll button 804*a* or the scroll button 804*b* on the touch panel 15 is touched by using the stick 16: see FIG. 17), the display change section 217 scrolls the first display area 801 so as to cause the first display control section 218 to sequentially display the second predetermined number of the first objects in the first display area 801. For example, when the scroll button 804*a* is touched by using the stick 16, the display change section 217 scrolls the first display area 801 so as to sequentially move leftward the second predetermined number of the first objects displayed in the first display area 801.

More specifically, when a position of the scroll button 804*a* or the scroll button 804*b* (see FIG. 17) on the touch panel 15 is touched by using the stick 16, the display change section 217 decreases or increases the position-in-display-order number of an item having the display position flag set to "1" in the link information shown in FIG. 5.

As described above, it is possible to easily change the first objects, 801*b*, 801*c*, and 801*d*, which correspond to the second predetermined number (3 in the present embodiment) of first objects, and are to be displayed in the first display area 801, by using the scroll button 804*a* or the scroll button 804*b* (see FIG. 17).

Further, when received is an operation input for scrolling the first display area 801 so as to change, by using a slide frame 803 (see FIG. 17), the second predetermined number (3 in the present embodiment) of first objects 801*b*, 801*c*, and 801*d* displayed in the first display area 801 (in the present embodiment, when a position of the slide frame 803 on the touch panel 15 is touched by using the stick 16 so as to slide the slide frame 803: see FIG. 17), the display change section 217 scrolls the first display area 801 so as to cause the first display control section 218 to display the second predetermined number of first objects. For example, when the slide frame 803 is touched by using the stick 16 and slid rightward, the display change section 217 scrolls leftward the first display area 801 in which the second predetermined number of first objects are displayed, and displays the scrolled first display area.

More specifically, when the position of the slide frame 803 on the touch panel 15 is touched by using the stick 16 so as to slide the slide frame 803, the display change section 217 increases/decreases the position-in-display-order number of an item having the display position flag set to "1" in the link information shown in FIG. 5.

As described above, it is possible to easily change, by using the slide frame 803 (see FIG. 17), the second predetermined number (3 in the present embodiment) of the first objects 801b, 801c, and 801d displayed in the first display area 801.

The first display control section 218 (corresponding to first display control means) is a functional section for selecting the second predetermined number (3 in the present embodiment) of the first objects 801b, 801c, and 801d (see FIG. 17) which have sequential position-in-display-order numbers, from among the first objects which correspond to the first predetermined number (for example, 16) of game programs and for which the position-in-display-order numbers are set, respectively, and for displaying the selected first objects 801b, 801c, and 801d in the first display area 801 on the LCD 12. Here, the second predetermined number is smaller than the first predetermined number.

Further, the first display control section 218 displays the second predetermined number of the first objects so as to enable determination as to whether or not each game program corresponds to the subject software. For example, the first display control section 218 displays the first object 811c (see FIG. 18) corresponding to the subject software so as to be blinked.

As described above, the second predetermined number of the first objects are displayed so as to enable determination as to whether or not each first object corresponds to the subject software, and therefore it is possible to easily determine, in a visual manner, the subject software based on the first object 811c (see FIG. 18) displayed in the first display area 811.

In the present embodiment, the first display control section 218 displays the first object 811c (see FIG. 18) corresponding to the subject software so as to be blinked. However, the first display control section 218 may display the first object in such a manner as to enable determination as to whether or not each first object corresponds to the subject software. For example, the first display control section 218 may display the first object corresponding to the subject software by using a specific color (for example, red color). Further, for example, the first display control section 218 may display the first object corresponding to the subject software so as to have a specific size (for example, so as to have a size which is 1.5 times larger than the size of the first object of a game program which does not correspond to the subject software). Further, the first display control section 218 may display, as an animation, the first object corresponding to the subject software.

Further, the first display control section 218 displays the first object based on the link information (see FIG. 5) stored in the link information storage section 241. That is, the first display control section 218 reads, from the image storage section 242, image information representing the first objects having position-in-display-order numbers (N−1), N, and (N+1), by using the first image ID, so as to display, at almost the center of the first display area, the first object of an item (for example, an item having the position-in-display-order number N) having the display position flag set to "1". However, for the first object having the non-open state flag set to "1", the first display control section 218 reads, from the image storage section 242, predetermined specific image information (the first object 801d shown in FIG. 17) instead of the image information identified by the first image ID, and displays an image represented by the predetermined specific image information having been read. Further, the first display control section 218 displays the first object of an item (for example, the item having the position-in-display-order number N) having the blink flag set to "1" so as to be blinked.

As described above, the first object is displayed based on the link information stored in the link information storage section 241, and therefore images represented by the information of the second predetermined number of first objects which are designated by the display change section 217 or the like can be displayed by using a simplified configuration.

The second display control section 219 (corresponding to second display control means) is a functional section for performing a predetermined display for displaying a predetermined game program included in the first predetermined number of game programs, at a position based on the positions in display order for the first predetermined number of game programs, in a second display area 802 which is different from the first display area 801 (see FIG. 17) on the LCD 12. Specifically, the second display control section 219 performs a predetermined display 802b (see FIG. 17) for displaying the game program determined as the subject software by the subject software determination section 214, at a position based on the positions in display order for the first predetermined number (for example, 16) of game programs, in the second display area 802 which is predetermined on the LCD 12 so as to be different from the first display area 801.

Further, the second display control section 219 displays, in the second display area 802, the second objects, 802a and 802b, and the third object 802c, in accordance with the list information shown in FIG. 5, and displays, as a position designation image, the second object 802b corresponding to the subject software so as to be distinguishable from the other second objects 802a (the second objects corresponding to software other than the subject software among the first predetermined number (for example, 16) of pieces of software). Here, a total number of the second objects, 802a and 802b, correspond to the first predetermined number (for example, 16), and the second objects, 802a and 802b, correspond to the first predetermined number of game programs, respectively, and are each smaller than the first object. Specifically, the second display control section 219 displays the second object 802b corresponding to the subject software so as to be blinked. As described above, in the present embodiment, the second objects corresponding to all the first predetermined number of pieces of software are displayed in the second display area.

As described above, the second object 802b (see FIG. 17) corresponding to the subject software is displayed so as to be distinguishable from the second object 802a other than the second object 802b corresponding to the subject software, and therefore it is possible to easily recognize, in a visual manner, the position-in-order for the subject software based on the second objects, 802a and 802b, displayed in the second display area 802.

Further, the second object 802b (see FIG. 17) corresponding to the subject software is displayed so as to be blinked, and therefore the position-in-order for the subject software can be visually recognized and emphasized, with enhanced easiness, by using the second objects, 802a and 802b, displayed in the second display area 802.

In the present embodiment, the second display control section 219 displays the second object 802b (see FIG. 17) corresponding to the subject software so as to be blinked. However, the first display control section 219 may display the second object in such a manner as to enable determination as to whether or not each second object corresponds to the subject software. For example, the second display control section 219 may display the second object corresponding to the subject software by using a specific color (for example, red color). Further, for example, the second display control section 219 may display the second object corresponding to the subject software so as to have a specific size (for example, so as to have a size which is 1.5 times larger than the size of the second object of a game program which does not correspond to the subject software). Further, the second display control section 219 may display, as an animation, the second object corresponding to the subject software.

Further, the second display control section 219 performs the predetermined display by linearly arranging and displaying the first predetermined number (for example, 16) of the second objects, 802a and 802b, (see FIG. 17).

As described above, the first predetermined number of second objects are linearly arranged and displayed, and therefore a position-in-order for a predetermined game program can be visually recognized with enhanced easiness based on the second objects, 802a and 802b, displayed in the second display area 802.

In the present embodiment, the second display control section 219 linearly arranges and displays the first predetermined number of the second objects. However, the second display control section 219 may arrange and display the first predetermined number of the second objects so as to form a grid pattern. In this case, the increased number of the second objects can be displayed in a narrow area.

In the present embodiment, the second display control section 219 linearly arranges and displays the first predetermined number of the second objects. However, the second display control section 219 may linearly arrange and display a third predetermined number (40 in the present embodiment) of objects corresponding to the second objects, 802a and 802b, and the third object 802c, and the third predetermined number is a maximum number of game programs which can be activated. In this case, the number (=(the third predetermined number)−(the first predetermined number) of game programs which can be added (=which can be additionally installed) can be easily recognized in a visual manner.

In the present embodiment, the second display control section 219 displays the first predetermined number (16 in the present embodiment) of the second objects. However, the second display control section 219 may display a fourth predetermined number (for example, 10) of the second objects, and the fourth predetermined number of the second objects is greater than or equal to the second predetermined number (for example, 3) of the second objects, and is smaller than or equal to the first predetermined number (16 in the present embodiment) of the second objects. In this case, a display area to be allocated to each second object can be increased, and therefore a manner for visually recognizing the second object can be improved. For example, various types of icons can be displayed as the second object.

In addition, the number of the third objects 802c (see FIG. 17) to be displayed by the second display control section 219 is the number (24 in the present embodiment) corresponding to a difference obtained by subtracting the first predetermined number (for example, 16) from the third predetermined number (40 in the present embodiment) which corresponds to a maximum number of the game programs which can be activated, and the third objects 802c are displayed so as to be distinguishable from the first predetermined number of the second objects corresponding to the second objects, 802a and 802b.

As described above, the number of the third objects 802c (see FIG. 17) to be displayed so as to be distinguishable from the first predetermined number of the second objects, 802a and 802b, is obtained by subtracting the first predetermined number from the third predetermined number, and therefore the number (=(the third predetermined number)−(the first predetermined number)) of the game programs which can be added (which can be additionally installed) can be easily recognized in a visual manner.

In the present embodiment, the second display control section 219 displays, as a square, each of the first predetermined number of the second objects, 802a and 802b (see FIG. 17), and displays each of the third objects 802c as a black circle smaller than each of the first predetermined number of the second objects, 802a and 802b. Here, the number of the third objects 802c corresponds to a difference obtained by subtracting the first predetermined number (for example, 16) from the third predetermined number (40 in the present embodiment).

Further, the second display control section 219 displays the slide frame 803 for enabling visual recognition of the positions, for the game programs corresponding to the second predetermined number (3 in the present embodiment) of the first objects, 801b, 801c, and 801d (see FIG. 17) which are displayed by the first display control section 218, in display order of the first predetermined number (for example, 16) of game programs.

As described above, the slide frame 803 (see FIG. 17) is displayed, and therefore the positions-in-display-order for the second predetermined number (3 in the present embodiment) of the first objects 801b, 801c, and 801d displayed by the first display control section 218 can be easily recognized in a visual manner.

In the present embodiment, the second display control section 219 displays the slide frame 803 indicating the first objects 801b, 801c, and 801d (see FIG. 17). However, the second display control section 219 may display a slide frame indicating the first object 801c.

Further, the classification section 221 classifies, into types (for example, types of games), the first predetermined number (for example, 16) of the game programs stored in the software information storage section 241, and the second display control section 219 displays the second objects such that each of the types of the first predetermined number of the game programs stored in the software information storage section 241 can be identified. For example, the second display control section 219 sets a color for the second object to be displayed, depending on the type of the game, and displays the second object with the color. Specifically, the second display control section 219 displays the second object for a role playing game in blue, displays the second object for a fighting game in yellow, and displays the second object for a card game in green. On the screens shown in FIG. 17 to FIG. 26, the display and description of the colors of the second objects are omitted for the sake of convenience.

As described above, the second objects are displayed such that each of the types (for example, types of games) into which second objects are classified by the classification section 221 can be identified, and therefore it is possible to easily recognize, in a visual manner, the position-in-order for a game program desired to be activated.

Further, the second display control section 219 displays the second object based on the link information (see FIG. 5) stored in the link information storage section 241. Specifically, the second display control section 219 displays the slide frame 803 (see FIG. 17) enclosing the second objects (or the third objects) having the position-in-display-order numbers (N−1), N, and (N+1) so as to enable visual recognition of the first object of an item (for example, an item having the position-in-display-order number N) which has the display position flag set to "1" and is displayed at almost the center of the first display area. Further, the second display control section 219 displays the second object of an item having the blink flag set to "1" (for example, the item having the position-in-display-order number N) so as to be blinked.

As described above, the second object is displayed based on the link information stored in the link information storage section 241, and therefore the second object information designated by the display change section 217 or the like can be displayed by using a simplified configuration.

The activation execution section 220 (corresponding to activation execution means) is a functional section for receiving an operation input from a user through the touch panel 15, and selecting, based on the received operation input, one of the second predetermined number (3 in the present embodiment) of the first objects, 801b, 801c, and 801d, displayed in the first display area 801 (see FIG. 17), and activating a game program corresponding to the selected first object.

Specifically, the activation execution section 220 activates, when a position of the first object 801c on the touched panel 15 is touched by using the stick 16, a game program corresponding to the first object 801c. Further, when a position of the first object 801b on the touch panel 15 is touched by using the stick 16, the activation execution section 220 scrolls rightward the first display area 801 in which the second predetermined number of the first objects are displayed, by a distance corresponding to one object, by means of the first display control section 218, so as to display the first object 801b at almost the center of the screen. Further, when a position of the first object 801d on the touch panel 15 is touched by using the stick 16, the activation execution section 220 scrolls leftward the first display area 801 in which the second predetermined number of the first objects are displayed, by a distance corresponding to one object, by means of the first display control section 218, so as to display the first object 801d at almost the center of the screen.

As described above, an operation input is received through the touch panel 15, thereby improving operability.

The classification section 221 (corresponding to classification means) is a functional section for classifying the first predetermined number (for example, 16) of the game programs stored in the software information storage section 241 into a plurality of types which are previously set. For example, the classification section 221 classifies the game programs based on types of games (such as a role playing game, a fighting game, a card game, and the like).

Figure 8:
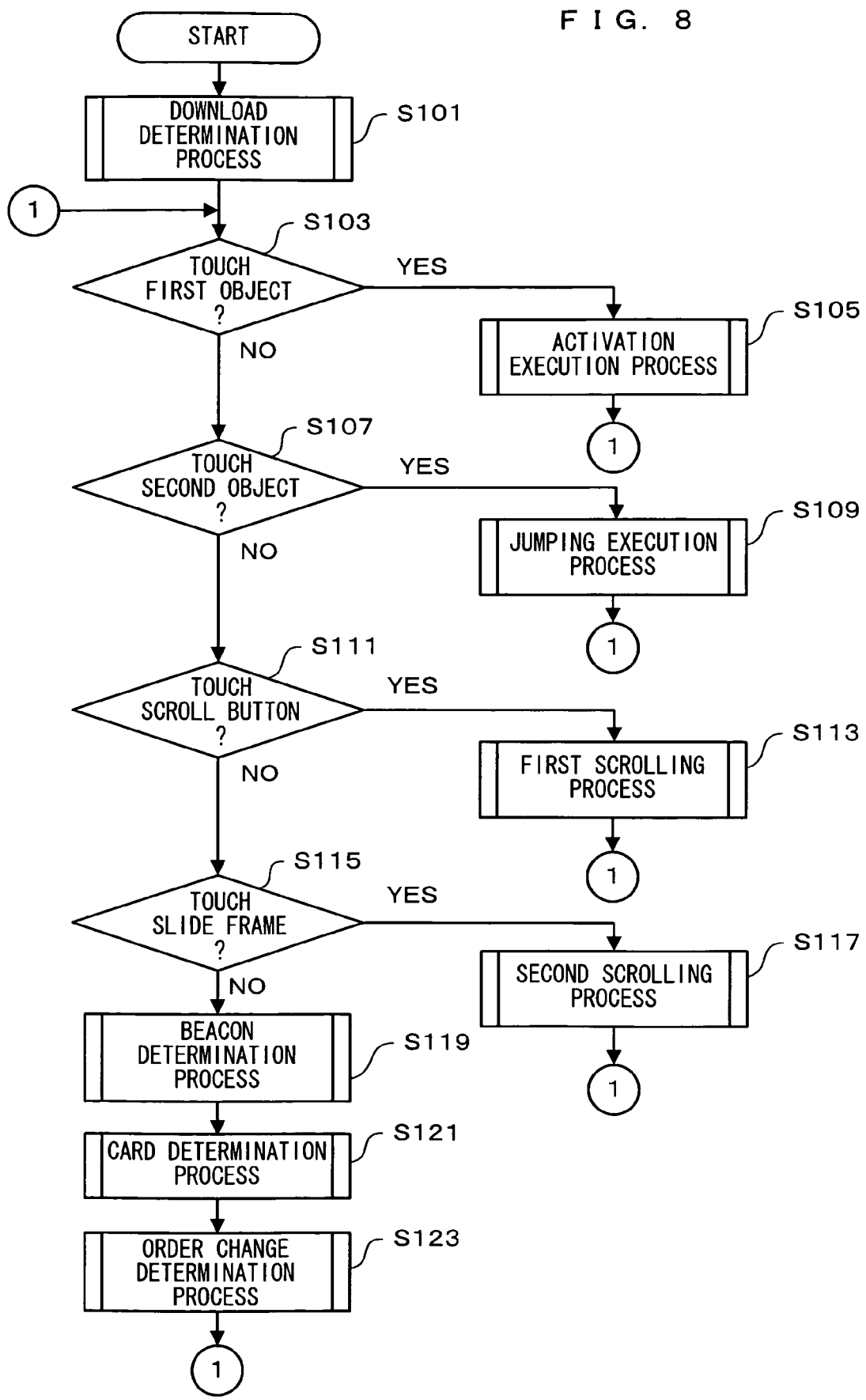
FIG. 8 is a flow chart showing an exemplary operation performed by the activation control apparatus.

Next, an exemplary operation performed by the activation control apparatus (the CPU core 21, the RAM 24, the flash memory 24a) of the present invention will be described with reference to flow charts shown in FIG. 8 to FIG. 16. In the flow charts shown in FIG. 8 to FIG. 16, a game program is referred to as an "application" for the sake of convenience. FIG. 8 is a flow chart showing an exemplary operation performed by the activation control apparatus (the CPU core 21, the RAM 24, the flash memory 24a). In step S101, the software acquisition section 212 performs a download determination process for determining whether or not a game program is acquired from the server device 6. In step S103, the activation execution section 220 determines whether or not the first object is touched by using the stick 16. When it is determined that the first object is touched (YES in S103), the process advances to step S105. When it is determined that the first object is not touched (NO in step S103), the process advances to step S107.

In step S105, the activation execution section 220 performs an activation execution process for performing an activation of a game program. In step S107, the display change section 217 determines whether or not the second object is touched by using the stick 16. When it is determined that the second object is touched (YES in S107), the process advances to step S109. When it is determined that the second object is not touched (NO in S107), the process advance to step S111.

In step S109, the display change section 217 perform a jumping execution process for displaying the first object corresponding to the second object having been touched. In step S111, the display change section 217 determines whether or not a scroll button is touched by using the stick 16. When it is determined that the scroll button is touched (YES in S111), the process advances to step S113. When it is determined that the scroll button is not touched (NO in S111), the process advances to step S115.

In step S113, the display change section 217 or the like performs a first scrolling process for scrolling and displaying the first objects based on an operation input made on the scroll button. In step S115, the display change section 217 determines whether or not the slide frame is touched by using the stick 16. When it is determined that the slide frame is touched (YES in S115), the process advances to step S117. When it is determined that the slide frame is not touched (NO in S115), the process advances to step S119.

In step S117, the display change section 217 or the like performs a second scrolling process for scrolling and displaying the first objects based on an operation input made on the slide frame. In step S119, the communication enablement determination section 211 or the like performs a beacon determination process which is a process based on a state of a communication with the shop server 4 (see FIG. 6). In step S121, the medium detection section 213 or the like performs a card determination process which is a process based on whether or not the memory card 17 is mounted. In step S123, the order change section 215 or the like performs order change determination process which is a process based on the order change operation for the first objects, and the process is returned to step S103, and step S103 and the process steps subsequent thereto are repeated.

Figure 9:
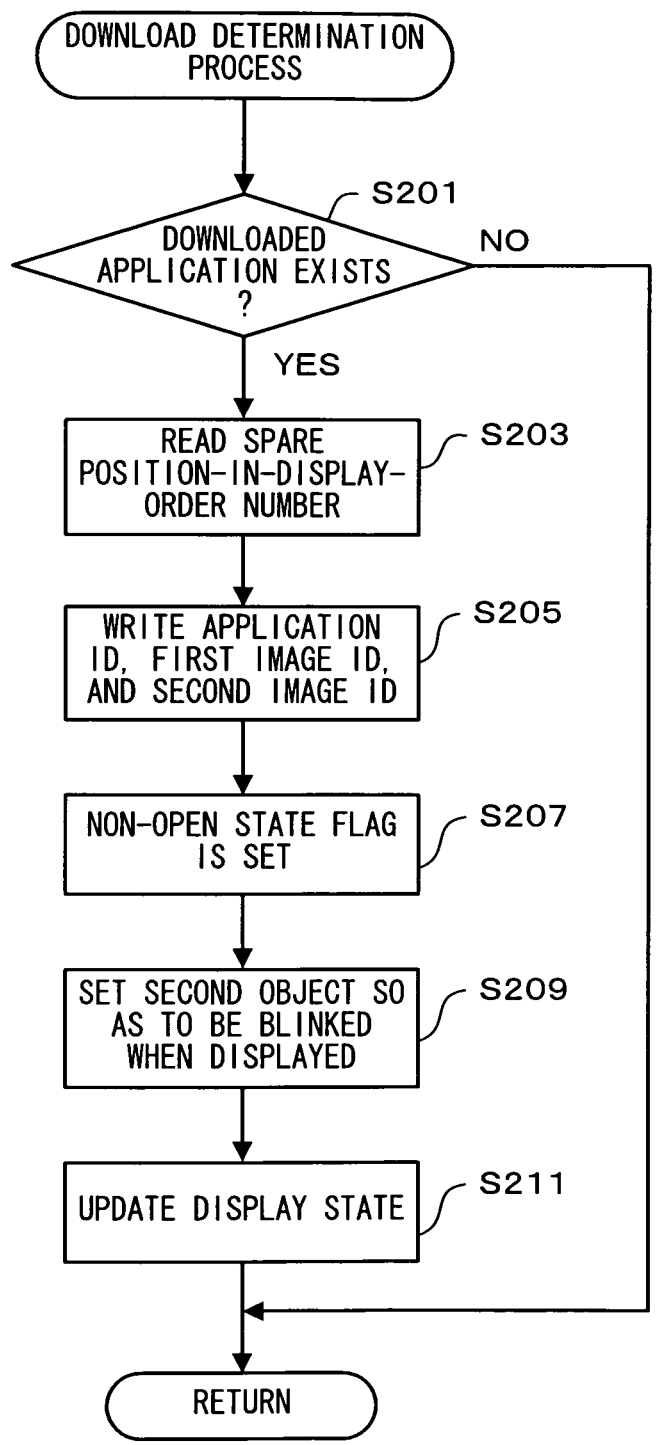
FIG. 9 is a flow chart showing in detail an example of a download determination process performed in step S101 shown in the flow chart of FIG. 8.

FIG. 9 is a flow chart showing in detail an example of the download determination process performed in step S101 shown in the flowchart of FIG. 8. In step S201, the software acquisition section 212 determines whether or not the game programs stored in the flash memory 24a includes a game program downloaded from the server device 6 (see FIG. 7) through the Internet 7. When it is determined that the downloaded game program is not included (NO in S201), the process is returned to step S103 shown in the flow chart of FIG. 8. When it is determined that the downloaded game program is included (YES in S201), the process advances to step S203.

In step S203, the software acquisition section 212 selects the smallest position-in-display-order number which is not associated with the application ID in the link information stored in the link information storage section 241 (S203). In step S205, the software acquisition section 212 writes the application ID, the first image ID, and the second image ID so as to be associated with the acquired game program, as an item (see FIG. 5) having the position-in-display-order number selected in step S203 in the link information stored in the link information storage section 241 (S205). In step S207, the software acquisition section 212 sets, to "1", the non-open state flag of the item (see FIG. 5) having the position-in-display-order number selected in step S203 in the link information stored in the link information storage section 241.

In step S209, the subject software determination section 214 determines that the game program determined in step S201 as a downloaded game program corresponds to the subject software, and sets, to "1", the blink flag of the item (see FIG. 5) having the position-in-display-order number selected in step S203. In step S211, the first display control section 218 and the second display control section 219 update display states of the first object and the second object, respectively, based on the link information stored in the link information storage section 241. When step S211 is ended, the process is returned to step S103 shown in the flow chart of FIG. 8.

FIG. 10 is a flow chart showing in detail an example of the activation execution process performed in step S105 shown in the flowchart of FIG. 8. In step S301, the activation execution section 220 determines whether or not the first object displayed at the center is touched by using the stick 16. When it is determined that the first object displayed at the center is touched (YES in S301), the process advances to step S303. When it is determined that the first object displayed at the center is not touched, (NO in S301), the process advances to step S313.

In step S303, the activation execution section 220 selects, as a game program to be executed, a game program corresponding to the first object having been touched in step S301. In step S305, the activation execution section 220 determines whether or not the game program which has been selected in step S303 is an unopened game program (=whether or not the non-open state flag is set to "1"), based on the link information stored in the link information storage section 241. When it is determined that the game program which has been selected in step S303 is not an unopened game program (=when it is determined that the game program which has been selected in step S303 is an opened game program) (NO in S305), the process advances to step S307. When it is determined that the game program which has been selected in step S303 is an unopened game program (YES in S305), the process advances to step S309.

In step S307, the activation execution section 220 activates the game program having been selected in step S303, and ends the process. In step S309, the activation execution section 220 sets, to "0", the non-open state flag (see FIG. 5) of the game program having been selected in step S303 (=opens the game program having been selected in step S303). In step S311, the activation execution section 220 sets, to "0", the blink flag (see FIG. 5) of the game program having been selected in step S303 (=returns the display state of the game program having been selected in step S303 to normal display state). When the process step of step S311 is ended, the process advances to step S319.

In step S313, the activation execution section 220 determines whether or not the first object displayed to the right of the center is touched by using the stick 16. When it is determined that the first object displayed to the right of the center is touched (YES in S313), the process advances to step S315. When it is determined that the first object displayed to the left of the center is touched (NO in S313), the process advances to step S317. In step S315, the activation execution section 220 sets, to "1", the display position flag (see FIG. 5) of an item which has the position-in-display-order number immediately following that of the item corresponding to the first object displayed at the center, and which is stored in the link information storage section 241, and sets, to "0", the display position flag of each of the other items stored in the link information storage section 241. In step S317, the activation execution section 220 sets, to "1", the display position flag (see FIG. 5) of an item which has the position-in-display-order number immediately preceding that of the item corresponding to the first object displayed at the center, and which is stored in the link information storage section 241, and sets, to "0", the display position flag of each of the other items stored in the link information storage section 241. When the process step of step S315 or step S317 is ended, the process advances to step S319. In step S319, the first display control section 218 and the second display control section 219 update display states of the first object and the second object, respectively, based on the link information stored in the link information storage section 241. When step S319 is ended, the process is returned to step S103 shown in the flow chart of FIG. 8.

Figure 11:
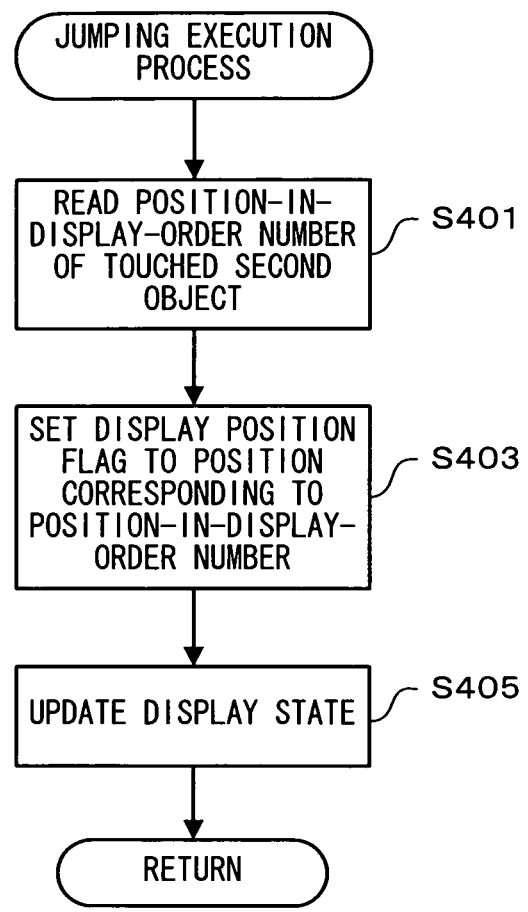
FIG. 11 is a flow chart showing in detail an example of a jumping execution process performed in step S109 shown in the flow chart of FIG. 8.

FIG. 11 is a flow chart showing in detail an example of the jumping execution process performed in step S109 shown in the flow chart of FIG. 8. In step S401, the display change section 217 reads, from the link information storage section 241, the position-in-display-order number of the second object having been touched by using the stick 16. In step S403, the display change section 217 sets, to "1", the display position flag of an item which has the position-in-display-order number having been read in step S401 and which is included in the link information stored in the link information storage section 241, and sets, to "0", the display position flag of each of the other items which are included in the link information stored in the link information storage section 241. In step S405, the first display control section 218 and the second display control section 219 update display states of the first object and the second object, respectively, based on the link information stored in the link information storage section 241. When the process step of step S405 is ended, the process is returned to step S103 shown in the flow chart of FIG. 8.

Figure 12:
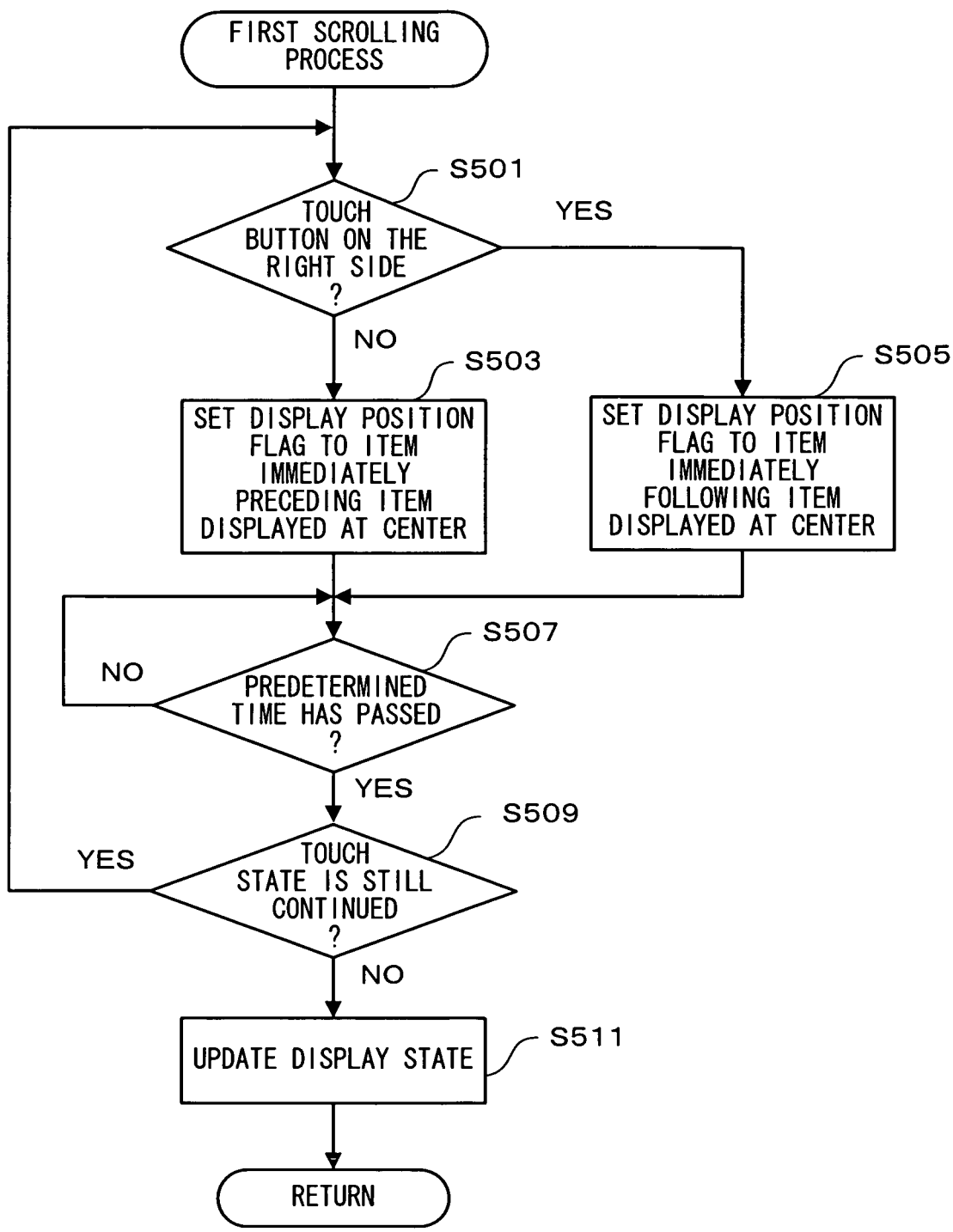
FIG. 12 is a flow chart showing in detail an example of a first scrolling process performed in step S113 shown in the flow chart of FIG. 8.

FIG. 12 is a flow chart showing in detail an example of the first scrolling process performed in step S113 shown in the flow chart of FIG. 8. In step S501, the display change section 217 determines whether or not the scroll button on the right side is touched by using the stick 16. When it is determined that the scroll button on the left side is touched (NO in S501), the process advances to step S503. When it is determined that the scroll button on the right side is touched (YES in S501), the process advances to step S505.

In step S503, the display change section 217 sets, to "1", the display position flag (see FIG. 5) of an item which has the position-in-display-order number immediately preceding that of the item which is currently displayed at the center, and which is included in the link information stored in the link information storage section 241, and sets, to "0", the display position flag of each of the other items which are included in the link information stored in the link information storage section 241. In step S505, the display change section 217 sets, to "1", the display position flag (see FIG. 5) of an item which has the position-in-display-order number immediately following that of the item which is currently displayed at the center, and which is included in the link information stored in the link information storage section 241, and sets, to "0", the display position flag of each of the other items which are included in the link information stored in the link information storage section 241. When the process step of step S503 or step S505 is ended, the process advances to step S507.

In step S507, the display change section 217 determines whether or not a predetermined time (for example, 0.3 seconds) has passed. When it is determined that the predetermined time has not passed (NO in S507), the process is in a waiting state. When it is determined that the predetermined time has passed (YES in S507), the process advances to step S509. In step S509, the display change section 217 determines whether or not the scroll button is still touched by using the stick 16. When it is determined that the scroll button is still touched (YES in S509), the process is returned to step S501, and the process step of step S501 and the process steps subsequent thereto are repeated. When it is determined that the scroll button is not touched (=that the stick 16 is removed) (NO in S509), the process advances to step S511. In step S511, the first display control section 218 and the second display control section 219 update display states of the first object and the second object, respectively, based on the link information stored in the link information storage section 241. When the process step of step S511 is ended, the process is returned to step S103 shown in the flow chart of FIG. 8.

Figure 13:
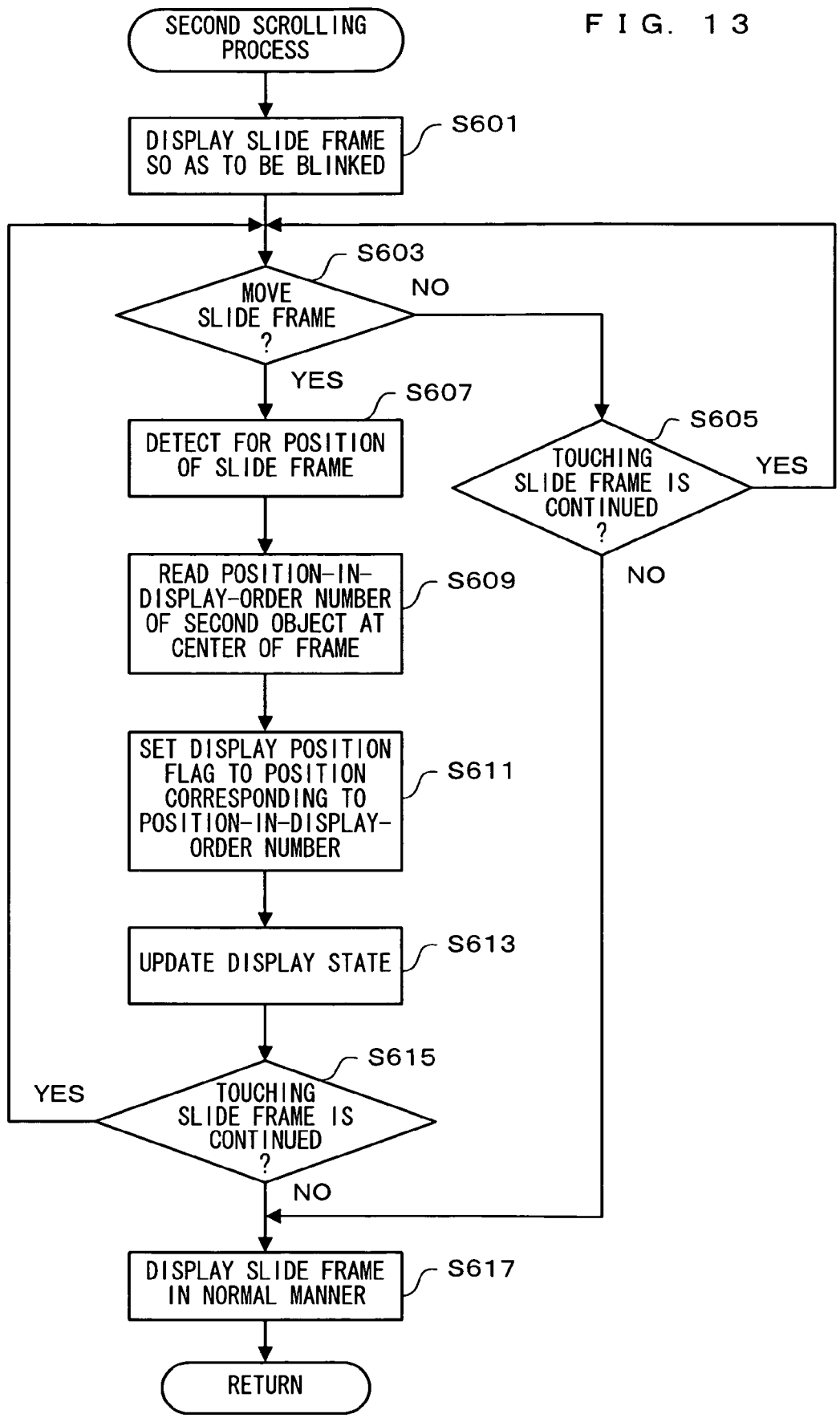
FIG. 13 is a flow chart showing in detail an example of a second scrolling process performed in step S117 shown in the flow chart of FIG. 8.

FIG. 13 is a flow chart showing in detail an example of the second scrolling process performed in step S117 shown in the flow chart of FIG. 8. In step S601, the display change section 217 displays the slide frame so as to be blinked by means of the second display control section 219. In step S603, the display change section 217 determines whether or not an operation input (=dragging the stick 16) for moving the slide frame is received. When it is determined that the operation input for moving the slide frame is not received (NO in S603), the process advances to step S605. When it is determined that the operation input for moving the slide frame is received (YES in S603), the process advances to step S607.

In step S605, the display change section 217 determines whether or not the slide frame is still touched by using the stick 16. When it is determined that the slide frame is still touched (YES in S605), the process is returned to step S603. When it is determined that the slide frame is not touched (=that the stick 16 is removed) (NO in S605), the process advances to step S617.

In step S607, the display change section 217 detects for a position of the slide frame. In step S609, the display change section 217 reads, from the link information storage section 241, the position-in-display-order number of the second object positioned at the center of the slide frame detected in step S607. In step S611, the display change section 217 sets, to "1", the display position flag of an item which has the position-in-display-order number having been read in step S609, and which is included in the link information stored in the link information storage section 241, and sets, to "0", the display position flag of each of the other items which are included in the link information stored in the link information storage section 241. In step S613, the first display control section 218 and the second display control section 219 update display states of the first object and the second object, respectively, based on the link information stored in the link information storage section 241.

In step S615, the display change section 217 determines whether or not the slide frame is still touched by using the stick 16. When it is determined that the slide frame is still touched (YES in S615), the process is returned to step S603. When it is determined that the slide frame is not touched (=when the stick 16 is removed) (NO in S615), the process advances to step S617. In step S617, the display change section 217 returns the display state of the slide frame to a normal display state by means of the second display control section 219. When the process step of step S617 is ended, the process is returned to step S103 shown in the flow chart of FIG. 8.

Figure 14:
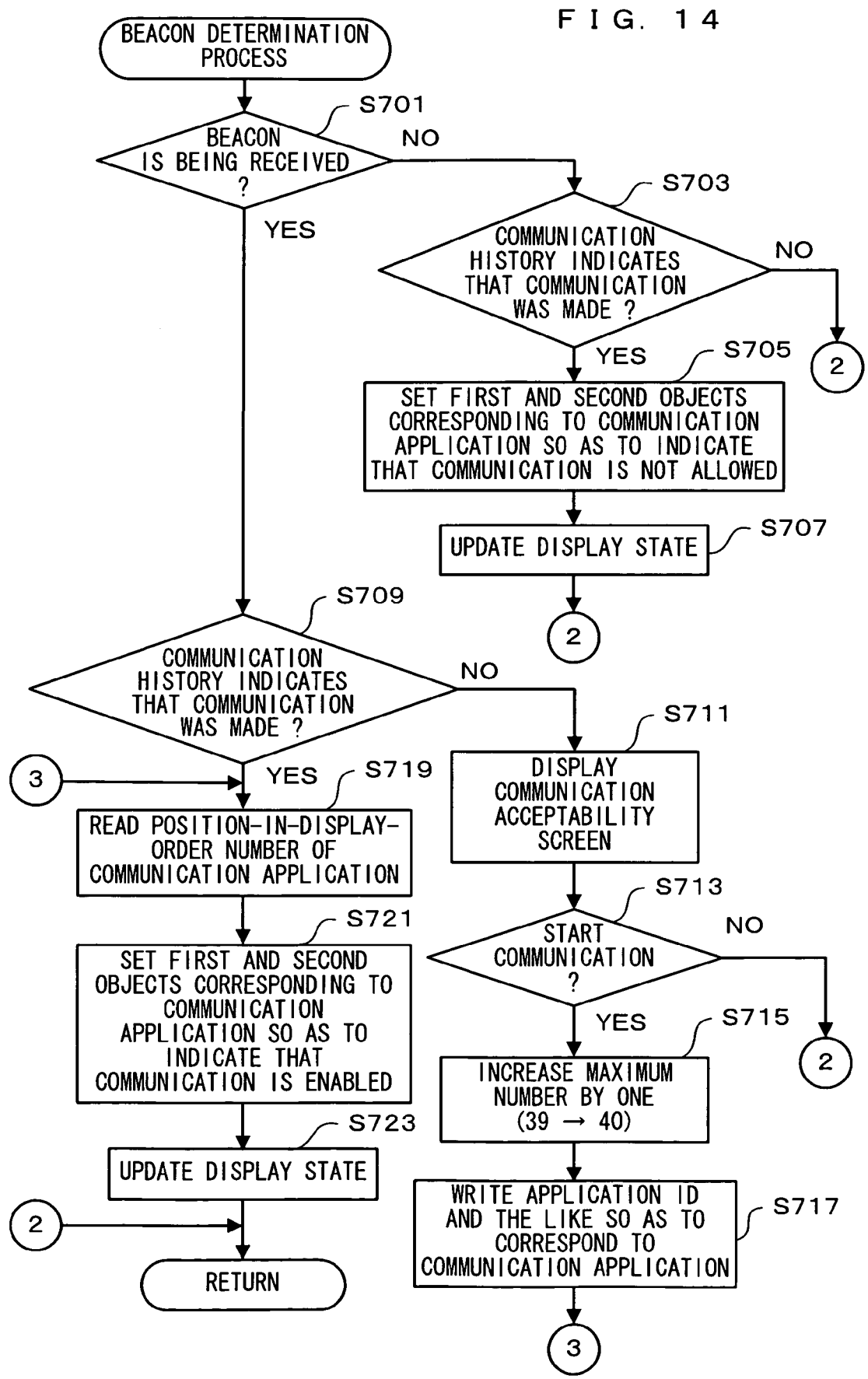
FIG. 14 is a flow chart showing in detail an example of a beacon determination process performed in step S119 shown in the flow chart of FIG. 8.

FIG. 14 is a flow chart showing in detail an example of the beacon determination process performed in step S119 shown in the flow chart of FIG. 8. In step S701, the communication enablement determination section 211 determines whether or not a beacon indicating that the communication with the shop server 4 is enabled is received. When it is determined that the beacon is received (=when it is determined that the communication is enabled) (YES in S701), the process advances to step S709. When it is determined that the beacon is not received (=when it is determined that the communication is not enabled) (NO in S701), the process advances to step S703.

In step S703, the subject software determination section 214 determines whether or not a communication history indicates that the communication with the shop server 4 had been made. When it is determined that the communication history indicates that the communication with the shop server 4 had been made (YES in S703), the process advances to step S705. When it is determined that the communication history indicates that the communication with the shop server 4 had not been made (NO in S703), the process is returned to step S121 shown in the flow chart of FIG. 8. In step S705, the subject software determination section 214 writes, in the link information stored in the link information storage section 241, an image ID indicating that the communication is not enabled, as the first image ID representing identification information of image data of the first object corresponding to the communication software for executing the communication with the shop server 4, and sets, to "0", the blink flag for the communication software for executing the communication with the shop server 4 (see FIG. 5 and FIG. 24). In step S707, the first display control section 218 and the second display control section 219 update display states of the first object and the second object, respectively, based on the link information stored in the link information storage section 241. When the process step of step S707 is ended, the process is returned to step S121 shown in the flow chart of FIG. 8.

In step S709, the subject software determination section 214 determines whether or not the communication history indicates that the communication with the shop server 4 had been made. When it is determined that the communication history indicates that the communication with the shop server 4 had not been made (NO in S703), the process advances to step S711. When it is determined that the communication history indicates that the communication with the shop server 4 had been made (YES in S709), the process advances to step S719. In step S711, the number increasing section 216 displays, on the second LCD 12 (see FIG. 1), the communication acceptability screen (see FIG. 23) which is a screen on which an operation input for starting the communication with the shop server 4 is to be received. In step S713, the number increasing section 216 determines whether or not "YES" button 866*a* of the communication acceptability screen 866 displayed in step S711 is touched by using the stick 16 (=whether or not the operation input for starting the communication is made). When it is determined that the operation input for starting the communication is not made (NO in S713), the process is returned to step S121 shown in the flow chart of FIG. 8. When it is determined that the operation input for starting the communication is made (YES in S713), the process advances to step S715.

In step S715, the number increasing section 216 increases, by one, the third predetermined number which is a maximum number of pieces of software which can be activated, that is, the number increasing section 216 increases the third predetermined number from 39 to 40. In step S717, the number increasing section 216 writes, in the link information stored in the link information storage section 241, the application ID corresponding to the communication software for executing the communication with the shop server 4 (see FIG. 5). When the process step of step S717 is ended, the process advances to step S719.

In step S719, the subject software determination section 214 reads, from the link information stored in the link information storage section 241, the position-in-display-order number of the application ID corresponding to the communication software for executing the communication with the shop server 4. In step S721, the subject software determination section 214 writes, in the link information stored in the link information storage section 241, an image ID indicating that the communication is enabled, as the first image ID representing the identification information of image data of the first object corresponding to the communication software for executing the communication with the shop server 4, and sets, to "1", the blink flag for the communication software for executing the communication with the shop server 4 (see FIG. 5 and FIG. 24). In step S723, the first display control section 218 and the second display control section 219 update display states of the first object and the second object, respectively, based on the link information stored in the link information storage section 241. When the process step of step S723 is ended, the process is returned to step S121 shown in the flow chart of FIG. 8.

Figure 15:
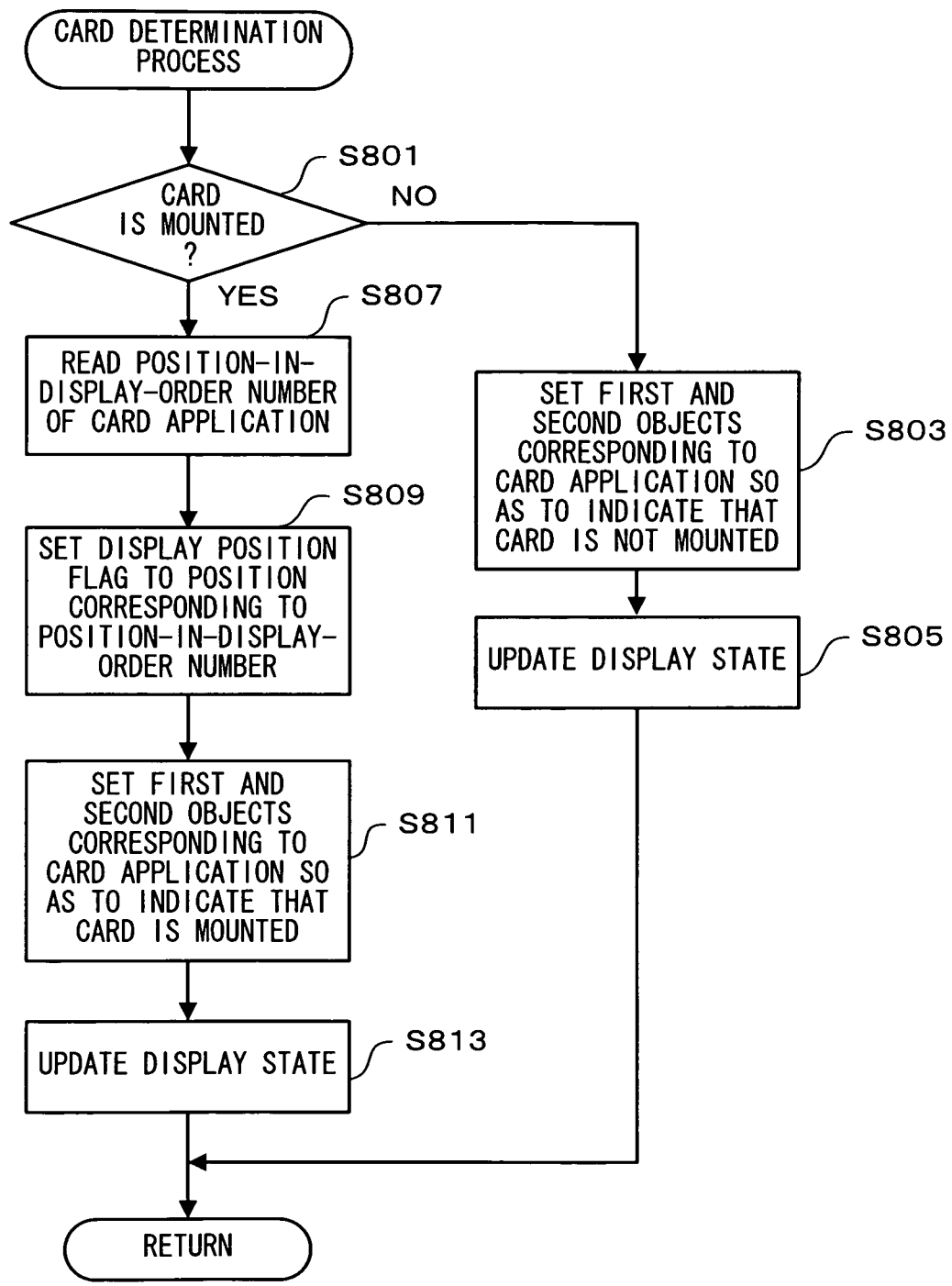
FIG. 15 is a flow chart showing in detail an example of a card determination process performed in step S121 shown in the flow chart of FIG. 8.

FIG. 15 is a flow chart showing in detail an example of the card determination process performed in step S121 shown in the flow chart of FIG. 8. In step S801, the medium detection section 213 determines whether or not the memory card 17 is mounted to the game apparatus 10. When it is determined that the memory card 17 is not mounted (NO in S801), the process advances to step S803. When it is determined that the memory card 17 is mounted (YES in S801), the process advances to step S807.

In step S803, the subject software determination section 214 writes, in the link information shown in FIG. 5, an image ID indicating a state where the memory card 17 is not mounted, as the first image ID of an item having the card application identification flag set to "1", and sets, to "0", the blink flag of the item which has the card application identification flag set to "1", and which is included in the link information shown in FIG. 5 (see FIG. 5 and FIG. 20). In step S805, the first display control section 218 and the second display control section 219 update display states of the first object and the second object, respectively, based on the link information stored in the link information storage section 241. When the process step of step S805 is ended, the process is returned to step S123 shown in the flow chart of FIG. 8.

In step S807, the position-in-display-order number of the item having the card application identification flag set to "1" is read from the link information shown in FIG. 5. In step S809, the subject software determination section 214 sets, to "1", the display position flag of an item which has the position-in-display-order number having been read in step S807, and is included in the link information stored in the link information storage section 241, and sets, to "0", the display position flag of each of the other items which are included in the link information stored in the link information storage section 241. In step S811, the subject software determination section 214 writes the first image ID representing the identification information of image data of the first object corresponding to the game program which is read from the memory card 17 and written in the software storage section 243, as the first image ID of the link information corresponding to the position-in-display-order number having been read in step S807, and sets, to "1", the blink flag of the link information corresponding to the position-in-display-order number having been read in step S807 (see FIG. 5 and FIG. 22). In step S813, the first display control section 218 and the second display control section 219 update display states of the first object and the second object, respectively, based on the link information stored in the link information storage section 241. When the process step of step S813 is ended, the process is returned to step S123 shown in the flow chart of FIG. 8.

Figure 16:
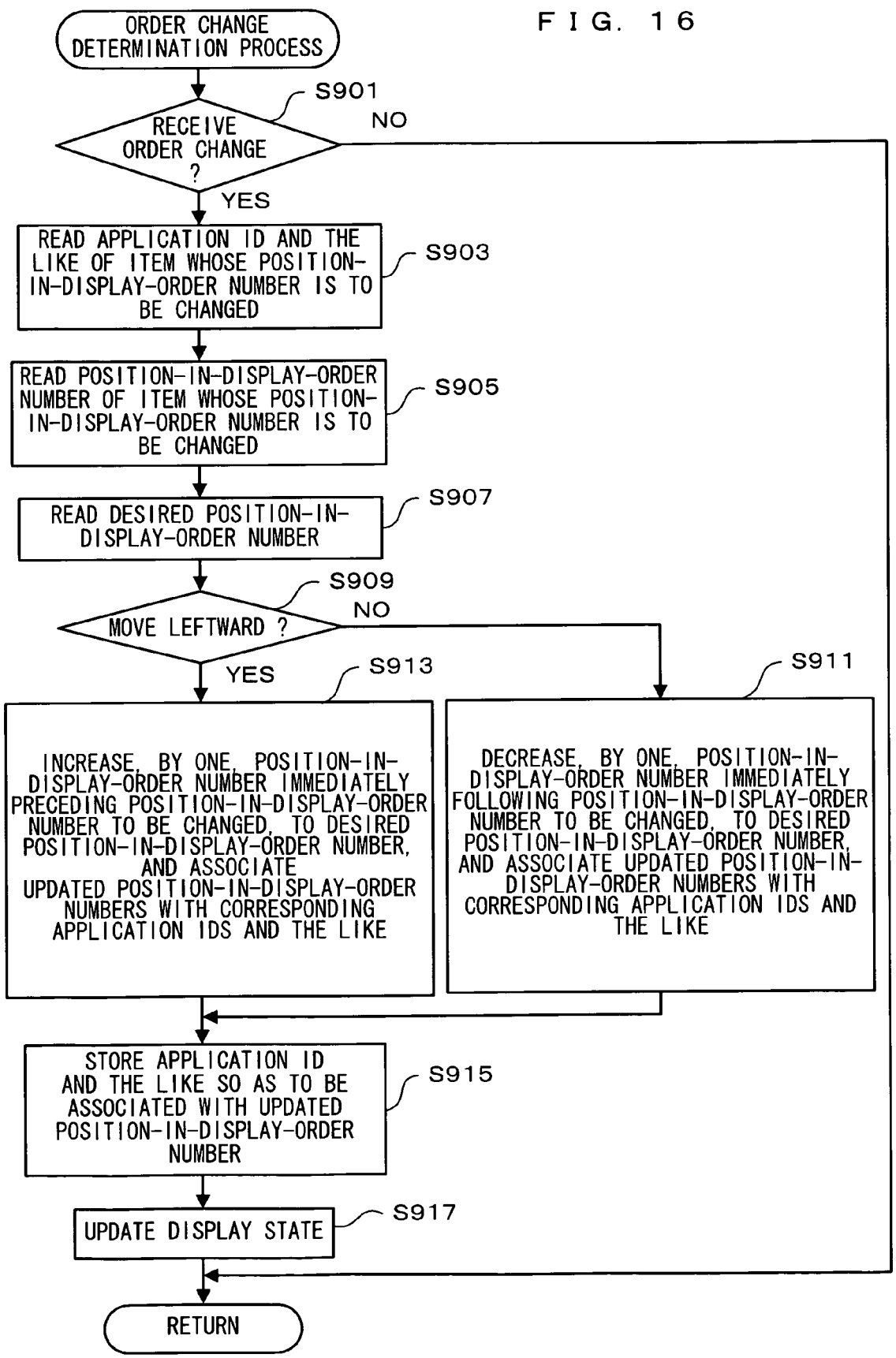
FIG. 16 is a flow chart showing in detail an example of an order change process performed in step S123 shown in the flow chart of FIG. 8.

FIG. 16 is a flow chart showing in detail an example of the order change process performed in step S123 shown in the flow chart of FIG. 8. In step S901, the order change section 215 determines whether or not an operation for changing the display order of the first objects is received. When it is determined that the operation for changing the display order is not received (NO in S901), the process is returned to step S103 shown in the flow chart of FIG. 8. When it is determined that the operation for changing the display order is received (YES in S901), the process advances to step S903.

In step S903, the order change section 215 reads, from the link information stored in the link information storage section 241, the application ID, the first image ID, the second image ID, the display position flag, the non-open state flag, and the blink flag (hereinafter, those will be referred to as "the application ID and the like"), all of which are associated with the first object of which the position in display order is to be changed. In step S905, the order change section 215 reads, from the link information stored in the link information storage section 241, the position-in-display-order number of the item of which the position in display order is to be changed. In step S907, the order change section 215 reads, from the link information stored in the link information storage section 241, the position-in-display-order number of an item representing a desired position-in-display-order number. In step S909, the order change section 215 determines whether or not the first object of which the position in display order is to be changed is moved leftward (=whether or not the first object of which the position in display order is to be changed is moved toward the first object having a smaller position-in-display-order number). When it is determined that the first object of which the position in display order is to be changed is moved rightward (NO in S909), the process advances to step S911. When it is determined that the first object of which the position in display order is to be changed is moved leftward (YES in S909), the process advances to step S913.

In step S911, the order change section 215 decreases, by one, each of the position-in-display-order number immediately following the position-in-display-order number having been read in step S905, to the position-in-display-order number having been read in step S907, among the link information stored in the link information storage section 241, which are associated with the application ID and the like (see FIG. 5). In step S913, the order change section 215 increases, by one, each of the position-in-display-order number having been read in step S907, to the position-in-display-order number immediately preceding the position-in-display-order number having been read in step S905, among the link information stored in the link information storage section 241, which are associated with the application ID and the like (see FIG. 5). When the process step of step S911 or step S913 is ended, the process advances to step S915.

In step S915, the order change section 215 writes, in the link information stored in the link information storage section 241, the application ID and the like which are read in step S903 so as to be associated with the item of the position-in-display-order number which has been read in step S907 as the desired position-in-display-order number. In step S917, the first display control section 218 and the second display control section 219 update display states of the first object and the second object, respectively, based on the link information stored in the link information storage section 241. The process step of step S917 is ended, the process is returned to step S103 shown in the flow chart of FIG. 8.

FIG. 17 is a diagram illustrating an exemplary operation reception screen displayed on the second LCD 12 before the display state is updated in step S319 shown in the flow chart of FIG. 10. On the operation reception screen 800, the first objects 801a to 801e are displayed in the first display area 801 at almost the center of the screen, and the second objects, 802a and 802b, and the third object 802c are displayed in the second display area 802 in the lower part of the screen, and a balloon section 805 is displayed in the upper part of the screen. Further, on the operation reception screen 800, the scroll buttons, 804a and 804b, are displayed on the both ends of the second display area 802, respectively, and the slide frame 803 is displayed in the second display area 802.

A portion (the half in the present embodiment) of each of the first object 801a and the first object 801e among the first objects 801a to 801e is displayed, and the first object 801b, the first object 801c, and the first object 801d are displayed such that a selection input for touching and selecting one of the first object 801b, the first object 801c, and the first object 801d through the touch panel 15 by using the stick 16 can be received. The first object 801d is the first object corresponding to a game program having been downloaded through the Internet, and is also the first object corresponding to a game program which has not been subjected to opening process (=which has not been opened) of step S309 shown in the flow chart of FIG. 10. That is, the first object 801d is an image indicating that the game program corresponding thereto is not opened, and, in the present embodiment, an image representing a ribboned package is displayed.

Further, the first object 801c displayed at the center has its outer edge enclosed by an operation content display frame 801f. The operation content display frame 801f represents a content of a process to be performed when a position of the first object 801c is touched by using the stick 16 through the touch panel 15. In this example, "start" is displayed, and it is indicated that the game program corresponding to the first object 801c is executed when the position of the first object 801c is touched by using the stick 16.

The total number of the second objects 802a each displayed as a black outlined square, and the second object 802b displayed as a black solid square, among the second objects, 802a and 802b, and the third object 802c, correspond to the first predetermined number (for example, 16) of the game programs stored in the flash memory 24a (see FIG. 2). Further, the second object 802b displayed as the black solid square is the second object corresponding to the subject software, and is the second object corresponding to the game program (=a predetermined game program) to be displayed as a position designation image. That is, the second object 802b displayed as the black solid square is blinked. Further, the number of the third objects 802c represents the number (24 (=40−16)) in the present embodiment) of the game programs which can be added (which can be additionally installed).

The slide frame 803 is a frame which visually indicates a position of each of the game programs corresponding to the second predetermined number (3 in the present embodiment) of the first objects, 801b, 801c and 801d, in order of the first predetermined number (16 in the present embodiment) of game programs. Further, the slide frame 803 is displayed so as to receive a scroll operation input for scrolling, by sliding the stick 16 on the touch panel 15, the first display area 801 in which the first objects are displayed.

The scroll buttons, 804a and 804b, are displayed so as to receive a scroll operation input for scrolling the first display area 801 in which the first objects are displayed, by performing touch operation by using the stick 16 on the touch panel 15. The balloon section 805 is used for displaying a caption (for example, a game name or the like) of the first object 801c displayed at the center, among the first objects, 801a to 801e.

Figure 18:
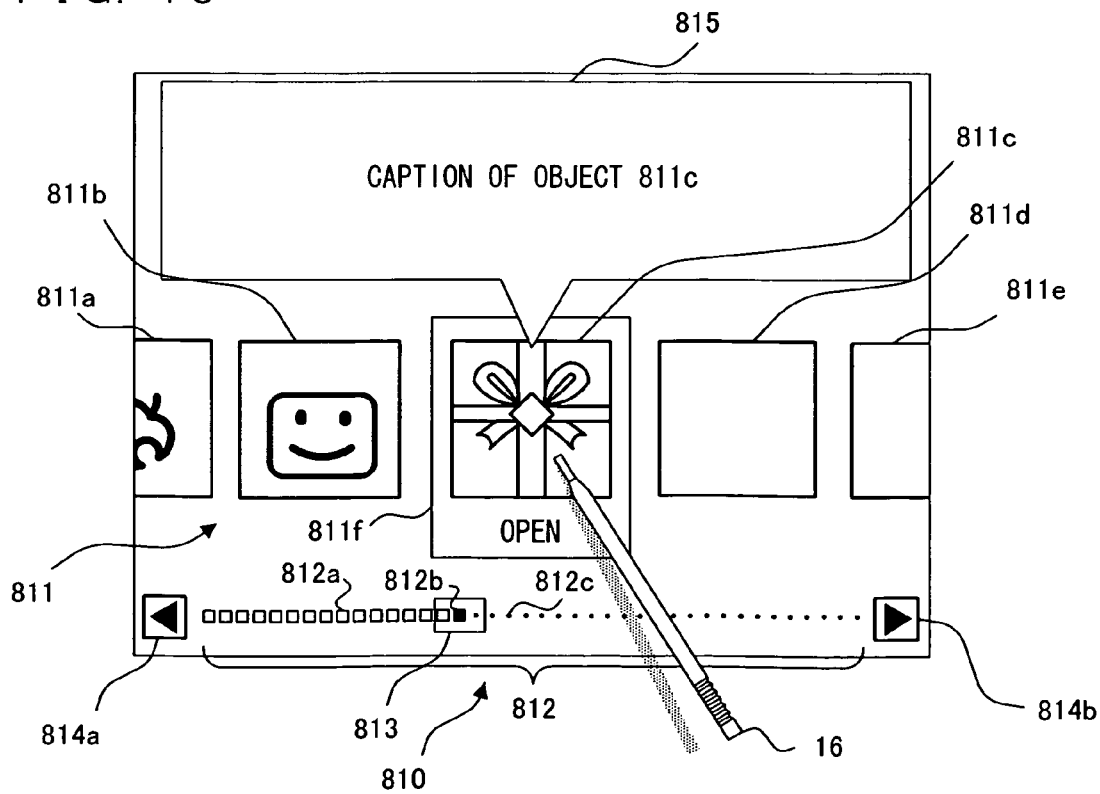
FIG. 18 is a diagram illustrating an exemplary operation reception screen displayed on the second LCD after display state is updated in step S319 shown in the flow chart of FIG. 10.

As shown in FIG. 17, when the touch operation for touching, by using the stick 16, a position of the first object 801d displayed on the operation reception screen 800 is received through the touch panel 15, the operation reception screen 810 as shown in FIG. 18 is displayed on the second LCD 12.

FIG. 18 is a diagram illustrating an exemplary operation reception screen displayed on the second LCD 12 after the display state is updated in step S319 shown in the flow chart of FIG. 10. As shown in FIG. 17, when the touch operation for touching, by using the stick 16, a position of the first object 801d displayed on the operation reception screen 800 is received through the touch panel 15, the first object 801d displayed on the right side of the operation reception screen 800 shown in FIG. 17 is moved to the center of the first display area 811 on the operation reception screen 810, and displayed as the first object 811c.

Further, "open" is indicated in the operation content display frame 811f, and when the touch operation for touching a position of the first object 811c by using the stick 16 is received, the opening process (the process step of step S309 shown in the flow chart of FIG. 10) for opening the game program corresponding to the first object 811c is performed.

Figure 19:
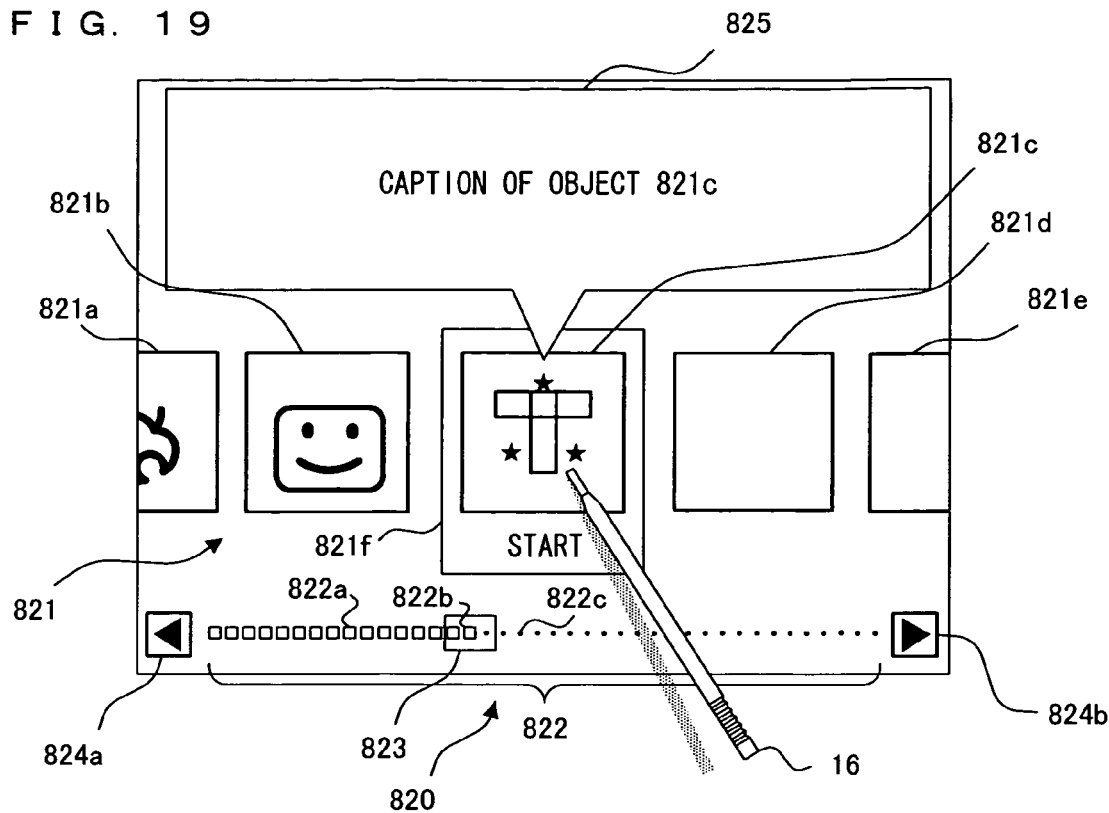
FIG. 19 is a diagram illustrating an exemplary operation reception screen displayed on the second LCD after display state is updated in step S319 shown in the flow chart of FIG. 10.

As shown in FIG. 18, the touch operation for touching, by using the stick 16, the position of the first object 801c displayed on the operation reception screen 810 is received through the touch panel 15, the operation reception screen 820 as shown in FIG. 19 is displayed on the second LCD 12.

FIG. 19 is a diagram illustrating an exemplary operation reception screen displayed on the second LCD 12 after the display state is updated in step S319 shown in the flow chart of FIG. 10. As shown in FIG. 18, when the touch operation for touching, by using the stick 16, the position of the first object 801c displayed on the operation reception screen 810 is received through the touch panel 15, the opening process (the process step of step S309 shown in the flow chart of FIG. 10) for opening the game program corresponding to the first object 801c is performed.

An icon image representing a content of the game program corresponding to the first object 821c is displayed as the first object 821c on the operation reception screen 820. Further, "start" is indicated in the operation content display frame 821f, and it is indicated that the game program corresponding to the first object 801c is executed when the touch operation for touching a position of the first object 821c by using the stick 16 is received.

FIG. 20 is a diagram illustrating an exemplary operation reception screen displayed on the second LCD 12 before the display state is updated in step S405 (or step S813 shown in the flow chart of FIG. 15) shown in the flow chart of FIG. 11. On the operation reception screen 830, the first objects, 831a to 831e are displayed in the first display area 831 at almost the center of the screen, and the second objects, 832a and 832b, and the third object 832c are displayed in the second display area 832 in the lower part of the screen, and a balloon section 835 is displayed in the upper part of the screen. Further, on the operation reception screen 830, the scroll buttons, 834a and 834b are displayed at the both ends of the second display area 832, and the slide frame 833 is displayed in the second display area 832.

The first object 831c among the first objects, 831a to 831e, is the first object indicating that the memory card 17 is not mounted. That is, the first object 831c is an image indicating that the memory card 17 is not mounted. Further, a message (characters indicating that "no card is mounted" in the present embodiment) indicating that the memory card 17 is not mounted is indicated in the balloon section 835.

The second object 832b displayed as a black solid square among the second objects, 832a and 832b, and the third object 832c is the second object corresponding to the subject software (in the present embodiment, a program which is downloaded from the server device 6 and is not opened). That is, the second object 802b displayed as the black solid square is displayed so as to be blinked.

Figure 21:
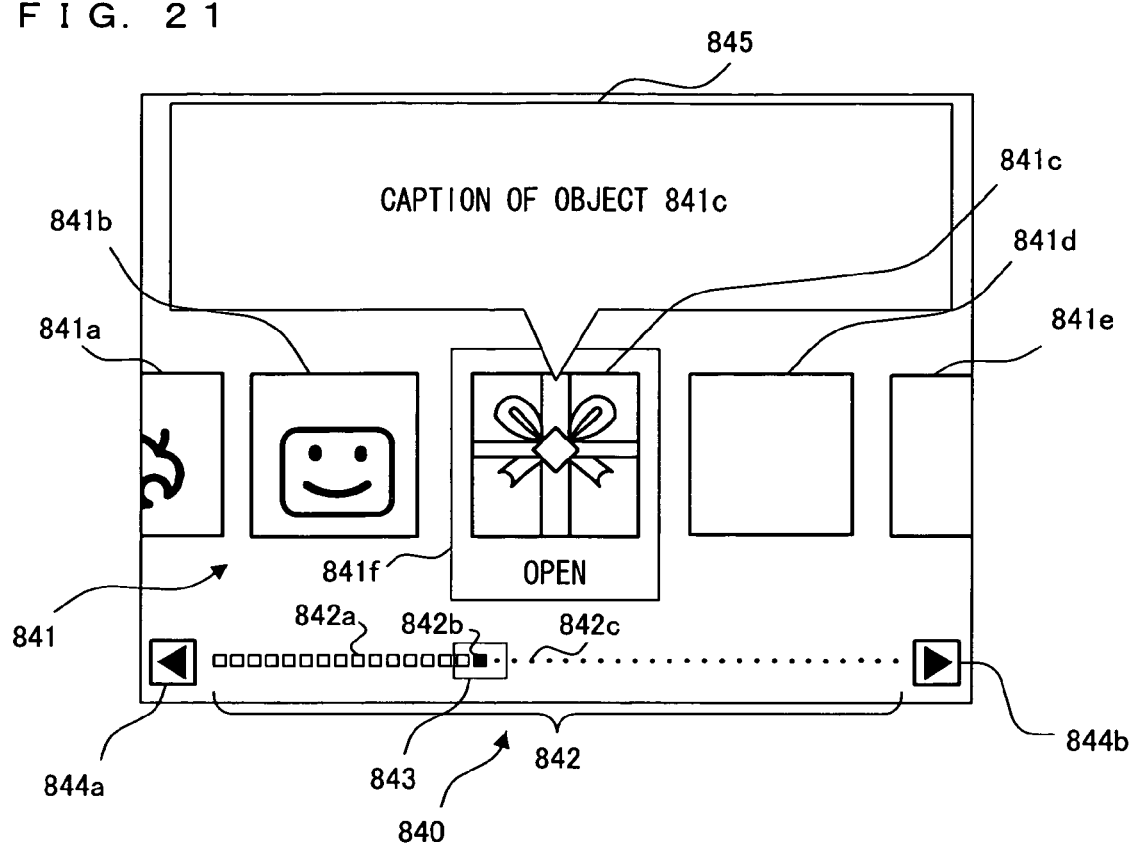
FIG. 21 is a diagram illustrating an exemplary operation reception screen displayed on the second LCD after display state is updated in step S405 shown in the flow chart of FIG. 11.

As shown in FIG. 20, when the touch operation for touching, by using the stick 16, a position of the second object 832b displayed on the operation reception screen 830 is received through the touch panel 15, the operation reception screen 840 as shown in FIG. 21 is displayed on the second LCD 12.

FIG. 21 is a diagram illustrating an exemplary operation reception screen displayed on the second LCD 12 after the display state is updated in step S405 shown in the flow chart of FIG. 11. As shown in FIG. 20, when the touch operation for touching, by using the stick 16, a position of the second object 832b displayed on the operation reception screen 830 is received through the touch panel 15, the first display area 841 is scrolled so as to display the corresponding first object 841c at the center of the first display area 841, as shown in FIG. 21.

Figure 22:
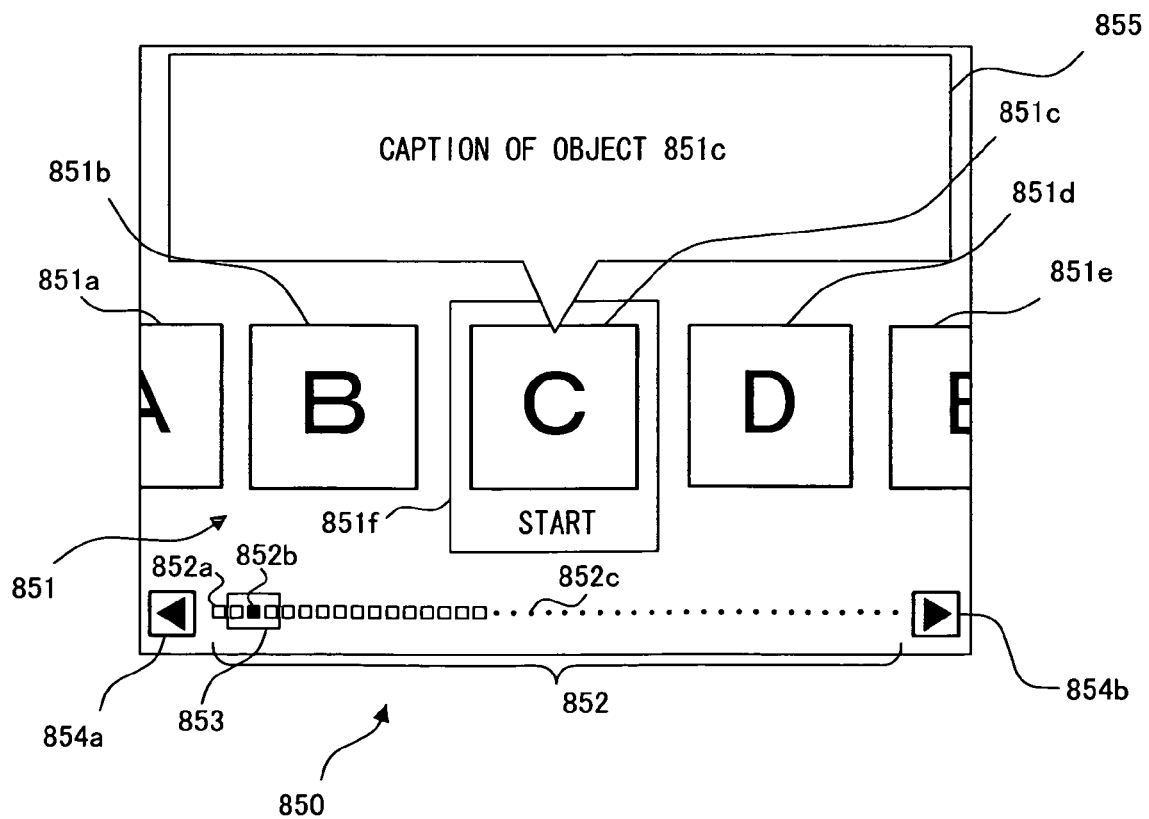
FIG. 22 is a diagram illustrating an exemplary operation reception screen displayed on the second LCD after display state is updated in step S813 shown in the flow chart of FIG. 15.

FIG. 22 is a diagram illustrating an exemplary operation reception screen displayed on the second LCD 12 after the display state is updated in step S813 shown in the flow chart of FIG. 15. When the memory card 17 is mounded in a state where the operation reception screen 830 shown in FIG. 20 is displayed, the first object 851c corresponding to the game program stored in the memory card 17 is displayed as shown in FIG. 22. Further, a caption (for example, a game name of the game program stored in the memory card 17 or the like) for the first object 851c is displayed in a balloon section 855.

Figure 23:
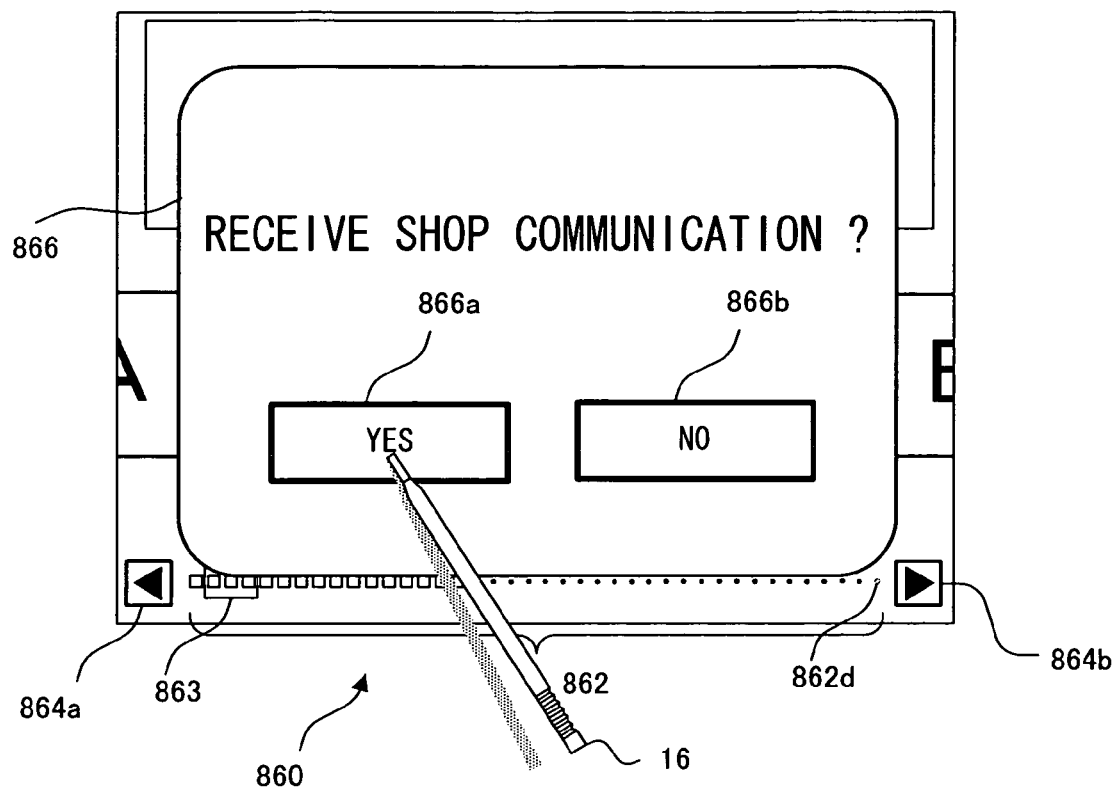
FIG. 23 is a diagram illustrating an example of a communication acceptability screen displayed on the second LCD in step S711 shown in the flow chart of FIG. 14.

FIG. 23 is a diagram illustrating an example of the communication acceptability screen displayed on the second LCD 12 in step S711 shown in the flow chart of FIG. 14. When the communication with the shop server 4 is enabled, and the communication history indicates that communication with the shop server 4 had not been made, the communication acceptability screen 860 as shown in FIG. 23 is displayed on the second LCD 12. On the communication acceptability screen 860, a communication acceptability display section 866 is displayed at almost the center of the screen. The communication acceptability display section 866 helps an operation input as to whether or not the communication with the shop server 4 is to be started, and YES button 866a and NO button 866b are displayed.

Figure 24:
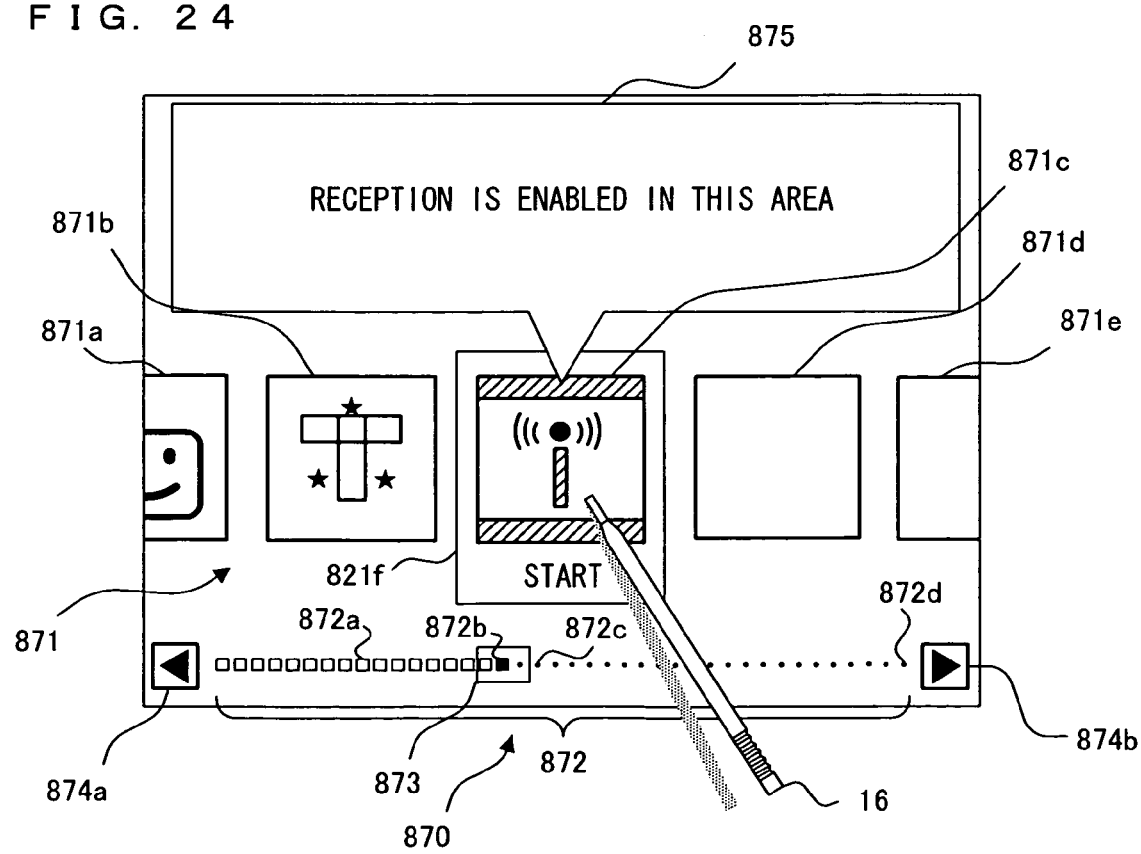
FIG. 24 is a diagram illustrating an exemplary operation reception screen displayed on the second LCD after display state is updated in step S723 shown in the flow chart of FIG. 14.

The YES button 866a is a button which is touched by a user using the stick 16 when the communication with the shop server 4 is to be started. The NO button 866b is a button which is touched by a user using the stick 16 when the communication with the shop server 4 is not to be started. When the YES button 866a is touched, the operation reception screen 870 as shown in FIG. 24 is displayed on the second LCD 12. When the NO button 866b is touched, the communication acceptability display section 866 is erased and the operation reception screen is displayed.

FIG. 24 is a diagram illustrating an exemplary operation reception screen displayed on the second LCD 12 after the display state is updated in step S723 shown in the flow chart of FIG. 14. When the YES button 866a is touched on the communication acceptability screen 860 shown in FIG. 23, the communication acceptability display section 866 shown in FIG. 23 is erased, and the first display area 871 on the operation acceptance screen 870 is scrolled so as to display, at the center, the first object 871c corresponding to the communication software for executing the communication with the shop server 4, as shown in FIG. 24. An icon image indicating communication enablement state is displayed as an image of the first object 871c. Further, the second object 872b corresponding to the first object 871c (=corresponding to the communication software for executing the communication with the shop server 4) is displayed so as to be blinked. Further, a message (characters indicating that "reception is enabled in this area" in the present embodiment) indicating that the communication with the shop server 4 is enabled is displayed in a balloon section 875. As shown in FIG. 24, when a position of the first object 871c is touched by using the stick 16 through the touch panel 15, the communication software is activated so as to start the communication with the shop server 4.

Further, when the YES button 866a is touched on the communication acceptability screen 860 shown in FIG. 23, the second object 862d, which is not displayed in FIG. 23 (although the second object 862d is displayed as a white circle for the sake of convenience in the present embodiment), is displayed, in FIG. 24, as the second object 872d of a black circle so as to indicate the number (24 (=40−16) in the present embodiment) of the game programs which can be added (which can be additionally installed). That is, it is indicated that the third predetermined number which is a maximum number of pieces of the software which can be activated is increased by one.

Figure 25:
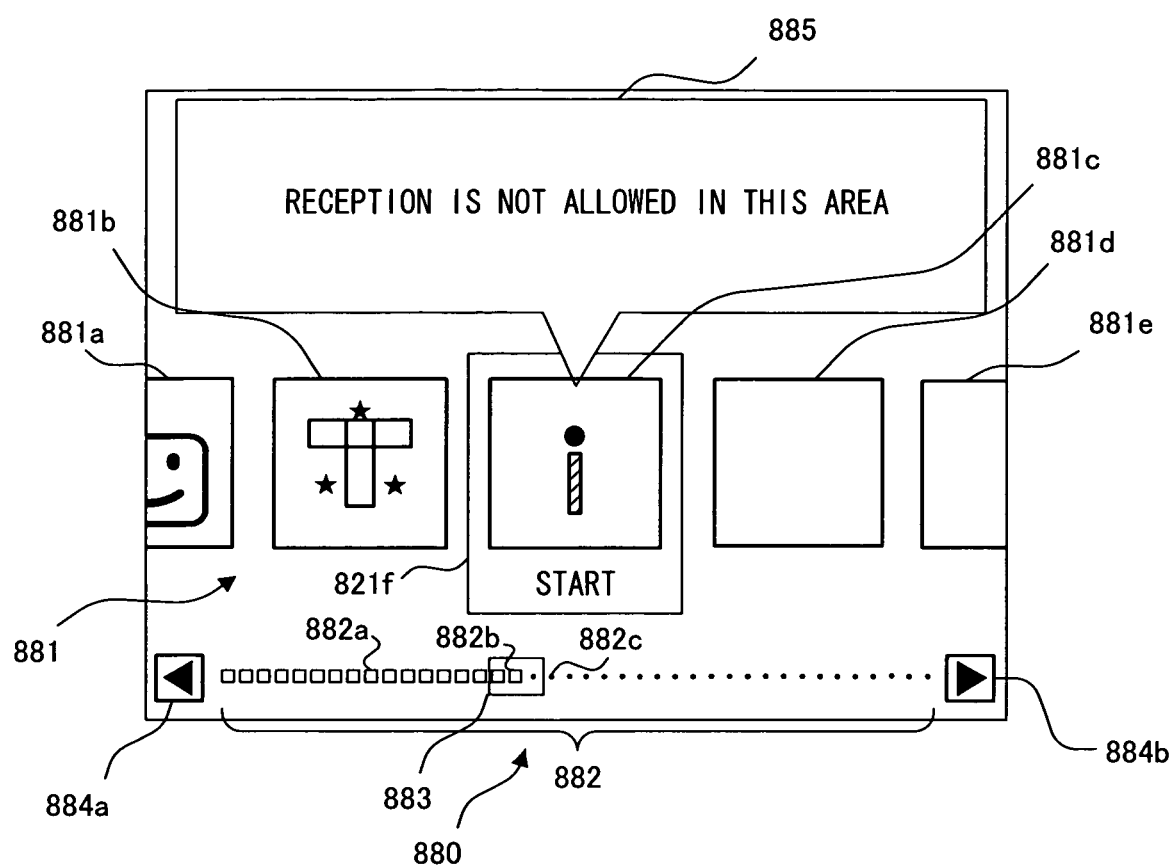
FIG. 25 is a diagram illustrating an exemplary operation reception screen displayed on the second LCD after display state is updated in step S707 shown in the flow chart of FIG. 14.

FIG. 25 is a diagram illustrating an example of the operation reception screen displayed on the second LCD 12 after the display state is updated in step S707 shown in the flow chart of FIG. 14. When the communication with the shop server 4 becomes impossible in a state where the operation reception screen 870 shown in FIG. 24 is displayed, the operation reception screen 880 shown in FIG. 25 is displayed. That is, an icon image representing a state where the communication is not enabled is displayed as an image of the first object 881c on the operation reception screen 880. Further, blinking-display of the second object 882b corresponding to the first object 881c (=corresponding to the communication software for executing the communication with the shop server 4) is stopped (=the display state of the second object 882b is returned to the normal display state). Further, a message (characters indicating that "reception is not allowed in this area" in the present embodiment) indicating that the communication with the shop server 4 is not enabled is displayed in the balloon section 875.

As described above, a predetermined display (the second object 802b in the present embodiment: see FIG. 17) corresponding to a predetermined game program is made at a position based on the positions in display order for the first predetermined number (16 in the present embodiment) of the game programs, thereby allowing a desired game program (the subject software in the present embodiment) to be easily selected and activated.

That is, for example, as shown in FIG. 17, the first object 801c displayed in the first display area 801 is designated by using the second object 802b, and one first object (for example, the first object 801c) is selected from among the second predetermined number of the first objects, 801b, 801c, and 801d, displayed in the first display area 801, so as to activate a desired game program, thereby enabling the desired game program to be easily selected and activated.

Although the activation control apparatus according to the present embodiment includes the CPU core 21, the RAM 24, and the flash memory 24a of the present embodiment, the present embodiment is not limited thereto. The present embodiment may have the following configuration.

(A) In the present embodiment, the CPU core 21 functionally includes the communication enablement determination section 211, the software acquisition section 212, the medium detection section 213, the subject software determination section 214, the order change section 215, the number increasing section 216, the display change section 217, the first display control section 218, the second display control section 219, the activation execution section 220, the classification section 221, and the like. However, at least one of the functional sections corresponding to the communication enablement determination section 211, the software acquisition section 212, the medium detection section 213, the subject software determination section 214, the order change section 215, the number increasing section 216, the display change section 217, the first display control section 218, the second display control section 219, the activation execution section 220, and the classification section 221 may be configured as hardware such as an electrical circuit.

(B) In the present embodiment, the second display control section 219 determines the display state of the second object based on whether or not the second object corresponds to the subject software (in the present embodiment, the second object of the game program corresponding to the subject software is displayed so as to be blinked). However, when the game program is determined as the subject software, the second display control section 219 may display the corresponding second object only. In this case, only the second object of the game program corresponding to the subject software is displayed, and therefore it is possible to activate the game program corresponding to the subject software with enhanced easiness.

(C) In the present embodiment, when the memory card 17 is not mounted (although any software stored in the memory card 17 cannot be read therefrom), the first display control section 218 displays the first object 831c (indicating that the memory card 17 is not mounted) in the first display area 831 as shown in FIG. 20, and the second display control section 219 displays, in the second display area 832, the second object 832a at a position corresponding to the position in display order for the first object 831c. Further, when the memory card 17 is mounted, the first display control section 218 changes, to the first object 851c representing the software read from the mounted memory card 17 as shown in FIG. 22, the first object representing a state where no card is mounted, which is to be displayed before the memory card 17 is mounted, and the second display control section 219 highlights (blinking-displays in the present embodiment), in the second display area 832, the second object 852b displayed at a position corresponding to the position in display order for the software.

In the aforementioned configuration, when the memory card 17 is not mounted, the second object 832a, which is displayed at a position corresponding to a position in display order of the first object 831c indicating that the memory card 17 is not mounted, is displayed as an object which is the same as the second object 832a displayed at positions corresponding to the positions in display order for other software stored in the flash memory 24a, as shown in FIG. 20. However, the second object, which is displayed at a position corresponding to the position in display order for the first object 831c indicating that the memory card 17 is not mounted, may be displayed as an object which is different from the second object 832a displayed at positions corresponding to the positions in display order for the other software stored in the flash memory 24a, or may be displayed so as to represent the same object as the second object 832a in a display manner different from that for the second object 832a. In this case, the second object 832a, which is displayed at a position corresponding to a position in display order for the first object 831c indicating that the memory card 17 is not mounted, may be displayed so as to be distinguishable from the second object 832a displayed at positions corresponding to the positions in display order for the other software stored in the flash memory 24a.

(D) Although in the present embodiment, the activation control apparatus is included in the game apparatus 10, the activation control apparatus may be included in another type of information processing apparatus. For example, the activation control apparatus may be included in a personal computer, a mobile telephone, a television receiver, a DVD (Digital Versatile Disc) player, or the like.

(E) Although in the present embodiment software of which the activation is controlled by the activation control apparatus is a game apparatus, the software may be another type of software. For example, the software may be an application program or the like.

(F) Although in the present embodiment the activation control apparatus acquires a game program from the server device 6 through the Internet 7, the activation control apparatus may acquire a game program in another manner. For example, the activation control apparatus may acquire a game program from the shop server 4, or the activation control apparatus may acquire a game program through a LAN (Local Area Network) or the like.

While the embodiment has been described in detail, the foregoing description is in all aspects illustrative and not restrictive. It is understood that numerous other modifications and variations can be devised without departing from the scope of the embodiment.

What is claimed is:

1. A non-transitory computer-readable storage medium having stored therein a control program configured to enable a user to select one of a first number of first objects for which an order is set, and the first number is greater than or equal to two, the control program causing a computer to perform:
   first display control for displaying, in a first display area, a partial subset of the first number of first objects;
   second display control for displaying, in a second display area that is different from the first display area, a second object representing the position among the first number of first objects, according to the order, of the partial subset which is currently displayed in the first display area; and
   display change for receiving an operation input on the second display area, and changing, based on the operation input having been received, the partial subset of first objects shown in the first display area.

2. The non-transitory computer-readable storage medium having stored therein the control program according to claim 1,
   wherein the computer is caused to further perform
   enablement determination for determining whether or not a function of an information processing apparatus operated by the user and executing the control program is able to be used, and wherein,
   when the enablement determination determines that the function is able to be used, the second display control sets, as a first object, an object for causing the computer to perform a process using the function, among the first number of first objects, and displays the second object at a position corresponding to a position of the first object in the order.

3. The non-transitory computer-readable storage medium having stored therein the control program according to claim 2, wherein the computer is configured such that a communication function for enabling a communication with a communication apparatus is able to be used as the function; wherein the enablement determination determines whether or not the communication with the communication apparatus is enabled by using the communication function; and wherein the second display control sets, as a first object, an object for causing the computer to perform a process using the communication function, among the first number of first objects, and displays the second object at a position corresponding to a position of the first object in the order.

4. The non-transitory computer-readable storage medium having stored therein the control program according to claim 2, wherein the first display control displays a first object in a manner depending on a determination result obtained from the enablement determination, and the first object is among the first number of first objects.

5. The non-transitory computer-readable storage medium having stored therein the control program according to claim 1, wherein the second display control displays, in the second display area, second objects which correspond to the first number of first objects, respectively, and displays, as the second object, a second object which corresponds to a first object, and are among the second objects corresponding to the first number of first objects, so as to be distinguishable from the second objects other than the second object corresponding to the first object.

6. The non-transitory computer-readable storage medium having stored therein the control program according to claim 5, wherein the computer is caused to further perform enablement determination for determining whether or not a function of an information processing apparatus executing the control program is able to be used, and wherein, when the enablement determination determines that the function is able to be used, the second display control displays the second object corresponding to a first object, in a manner depending on a determination result obtained from the enablement determination.

7. The non-transitory computer-readable storage medium having stored therein the control program according to claim 5, wherein the second display control linearly arranges and displays the first number of the second objects.

8. The non-transitory computer-readable storage medium having stored therein the control program according to claim 7, wherein the second display control displays scroll buttons, near both ends of the second display area, respectively, for scrolling the first display area in which the partial subset of the first number of first objects are displayed, and wherein, when an operation input for scrolling the first display area in which the partial subset of the first number of first objects is displayed is received through one of the scroll buttons, the display change scrolls, by means of the first display control, the first display area in which the partial subset of first number of first objects is displayed so as to change the partial subset of the first number of first objects to be displayed.

9. The non-transitory computer-readable storage medium having stored therein the control program according to claim 5, wherein, when an operation input for selecting the second object which corresponds to a first object and is displayed by the second display control is received, the display change displays, in the first display area, a first object which corresponds to the selected second object and is among the first number of first objects, by means of the first display control.

10. The non-transitory computer-readable storage medium having stored therein the control program according to claim 5, wherein the computer is caused to further perform classification for classifying the first number of first objects into a of types, and the number of types is greater than or equal to two, and wherein the second display control displays the second objects which correspond to the first number of first objects, respectively, and which are classified into the number of types by the classification , so as to be each identified by one of the number of types.

11. The non-transitory computer-readable storage medium having stored therein the control program according to claim 5, wherein the second display control displays third objects so as to be distinguishable from the first number of the second objects, and a number of the third objects is a number corresponding to a difference obtained by subtracting the first number from a second number which is a maximum number of objects which can be activated by the control program.

12. The non-transitory computer-readable storage medium having stored therein the control program according to claim 11, wherein the computer is caused to further perform number increasing for determining whether or not requirements are satisfied, and increasing the second number by an amount when it is determined that the predetermined requirements are satisfied.

13. The non-transitory computer-readable storage medium having stored therein the control program according to claim 12, wherein the computer is connected to a communication apparatus so as to enable communication therebetween; wherein the computer is caused to further perform communication enablement determination for determining whether or not the communication with the communication apparatus is enabled, and wherein the requirements are requirements that the communication enablement determination determines that the communication with the communication apparatus is enabled, and an operation input for starting the communication with the communication apparatus is received.

14. The non-transitory computer-readable storage medium having stored therein the control program according to claim 1, wherein the display change receives an operation input on the second display by displaying the second object in the second display area, and displays, based on the operation input having been received, a first object which corresponds to the second object and is among the first number of first objects, in the first display area.

15. The non-transitory computer-readable storage medium having stored therein the control program according to claim 1, wherein the second display control displays an image, in a visual manner, indicating a position, of an object selected to be activated, in the set order, before the selected object is activated.

16. The non-transitory computer-readable storage medium having stored therein the control program according to claim 1, wherein
the second display control displays an image, in a visual manner, indicating positions, of objects among the first number of first objects corresponding to the partial subset of the first number of first objects, respectively, displayed by the first display control, in the set order.

17. The non-transitory computer-readable storage medium having stored therein the control program according to claim 1, wherein,
when the computer performs a process, the second display control sets, as a first object, an object corresponding to the process, and displays the second object at a position which corresponds to a position among the first number of first objects, of the object corresponding to the process, in the set order.

18. The non-transitory computer-readable storage medium having stored therein the control program according to claim 1, wherein
the computer is provided in a housing to which a storage medium storing software is detachably mounted, wherein
the control program is operable to activate first software corresponding to the software stored in the storage medium, and second software corresponding to software stored in a non-volatile storage medium in the housing, and the first software and the second software form the first number of first objects, and wherein
the second display control sets the first software as a first object, and displays the second object at a position corresponding to a position of the first object in the set order.

19. The non-transitory computer-readable storage medium having stored therein the control program according to claim 18, wherein
the computer is caused to further perform
medium detection for detecting whether or not the storage medium is mounted to the housing, and wherein
the second display control displays the second object when the medium detection detects that the storage medium is mounted.

20. The non-transitory computer-readable storage medium having stored therein the control program according to claim 19, wherein
the medium detection detects whether or not the storage medium is mounted in the housing after an information processing apparatus executing the control program is powered on.

21. The non-transitory computer-readable storage medium having stored therein the control program according to claim 18, wherein
the second display control displays, in the second display area, second objects which are each smaller than the first objects, and correspond to the first number of first objects, respectively, and displays a second object which corresponds to the first object and is among the second objects corresponding to the first number of first objects so as to be distinguishable from the second objects other than the second object corresponding to the first object.

22. The non-transitory computer-readable storage medium having stored therein the control program according to claim 21, wherein
second display control displays a second object corresponding to the second software, and displays a second object which corresponds to the first software and is distinguishable from the second object corresponding to the second software.

23. The non-transitory computer-readable storage medium having stored therein the control program according to claim 21, wherein
an order of the first software, among the first number of first objects, for a case where the storage medium is mounted is set regardless of whether or not the storage medium is mounted in the housing, wherein
the second display control displays a second object corresponding to the first software, at a position corresponding to a position of the second object in the order for the first software when the medium detection detects that the storage medium is mounted, and wherein
a third object which corresponds to the first software and is distinguishable from the second object is displayed at a position corresponding to a position of the third object in the order for the first software when the medium detection does not detect that the storage medium is mounted.

24. The non-transitory computer-readable storage medium having stored therein the control program according to claim 21, wherein
an order of the first software for a case where the storage medium is mounted is set regardless of whether or not the storage medium is mounted in the housing, wherein
the second display control displays second objects such that a portion of the second objects correspond to the first software, and a remaining portion of the second objects correspond to the second software, and wherein
an image obtained by changing display state of the second objects corresponding to the first software is displayed as the second object when the medium detection detects that the storage medium is mounted.

25. The non-transitory computer-readable storage medium having stored therein the control program according to claim 1, wherein
the computer is connected to another computer so as to enable communication therebetween, the another computer configured to transmit software, wherein
the computer is caused to further perform
acquisition determination for determining whether or not each of the first number of first objects is acquired from the another computer, and wherein
the second display control sets, as a first object, the object determined, by the acquisition determination, as having been acquired from the another computer, among the first number of first objects, and displays the second object at a position corresponding to a position of the first object in the set order.

26. The non-transitory computer-readable storage medium having stored therein the control program according to claim 1, wherein
the computer is caused to further perform
order change for receiving an operation input on the second display area, and changing, based on the operation input having been received, a display order of the first number of first objects.

27. The non-transitory computer-readable storage medium having stored therein the control program according to claim 1, wherein
the second display control displays an order of a first number of first objects by using a display order of second objects corresponding to the first number of first objects, respectively, and the first number of first objects is greater than or equal to the partial subset of first number of first objects, and the first number of first objects includes the partial subset of the first number of first objects, and wherein the display change receives an operation input on the second display area based on the first number of the second objects displayed in the second display area, and displays, in the first display area, the partial subset of the first number of first objects including a first object of software corresponding to one of the second objects, which is designated through the operation input having been received.

28. The non-transitory computer-readable storage medium having stored therein the control program according to claim 1, wherein
the control program is executed by an information processing apparatus which is provided in a game apparatus, and wherein
the first objects are application software for executing a game.

29. The non-transitory computer-readable storage medium having stored therein the control program according to claim 1, wherein
said first object represents software having a specific title.

30. The non-transitory computer-readable storage medium having stored therein the control program according to claim 1, wherein
said first object represents software corresponding to a program for executing a communication process.

31. The non-transitory computer-readable storage medium having stored therein the control program according to claim 1, wherein
said first object represents software corresponding to a program stored in a memory card.

32. The non-transitory computer-readable storage medium having stored therein the control program according to claim 1, wherein
said first object represents software corresponding to an unopened downloaded program.

33. The non-transitory computer-readable storage medium according to claim 1, wherein
the second display control displays the second object representing a first object on the second display area, even when the first object is not displayed on the first display area.

34. The non-transitory computer-readable storage medium according to claim 1, wherein
the second image is an image different from images representing said displayed partial subset of the first number of first objects and represents the position of the first object in the set order.

35. The non-transitory computer-readable storage medium having stored therein the control program according to claim 1, wherein
the display change causes scrolling of the first display area so that a first object represented by the second object having received the operation input is displayed at the center of the first display area.

36. The non-transitory computer-readable storage medium having stored therein the activation control program according to claim 1, wherein
the second display control displays in the second display area an object that is different from said second object, said object representing said partial subset of first objects displayed in the first display area.

37. A control apparatus for selecting one of a first number of first objects for which an order is set, and the first number is greater than or equal to two, the control apparatus comprising:
a display;
a first display control unit for displaying, in a first display area, a partial subset of the first number of first objects;
a second display control unit for displaying, in a second display area that is different from the first display area a second object representing the position among the first number of first objects, according to the order, of the partial subset which is currently displayed in the first display area; and
a display change unit for receiving an operation input on the second display area, and changing, based on the operation input having been received, the partial subset of first objects shown in the first display area.

38. The control apparatus according to claim 37, wherein
the second display control unit is configured to display the second object representing a first object on the second display area, even when the first object is not displayed on the first display area.

39. The control apparatus according to claim 37, wherein
the second image is an image different from images representing said displayed partial subset of first objects and represents the position of the first object in the set order.

40. The control apparatus according to claim 37, wherein
the display change unit causes scrolling of the first display area so that a first object represented by the second object having received the operation input is displayed at the center of the first display area.

41. The control apparatus according to claim 37, wherein
the second display control unit displays in the second display area an object that is different from said second object, said object representing said partial subset of first number of first objects displayed in the first display area.

42. A computer-implemented method for selecting one of a first number of first objects for which an order is set, and the first number is greater than or equal to two, the method comprising:
displaying, in a first display area, a partial subset of the first number of first objects;
displaying, in a second display area that is different from the first display area a second object representing the position among the first number of first objects, according to the order, of the partial subset which is currently displayed in the first display area;
receiving an operation input on the second display area, and changing, via one or more computer processors, based on the operation input having been received, the partial subset of first objects shown in the first display area.

43. The computer-implemented method according to claim 42, wherein
the second object representing a first object is displayed on the second display area, even when the first object is not displayed on the first display area.

44. The computer-implemented method according to claim 42, wherein
the second image is an image different from images representing said displayed partial subset of first objects and represents the position of the first object in the set order.

45. The method according to claim 42, wherein
the display changing causes scrolling of the first display area so that a first object represented by the second object having received the operation input is displayed at the center of the first display area.

46. The method according to claim 42, wherein
the displaying in the second display area displays in the second display area an object that is different from said second object, said object representing said partial subset of first number of first objects displayed in the first display area.

47. An information processing system including a control apparatus for selecting one of a first number of first objects for which an order is set, and the first number is greater than or equal to two, the information processing system comprising:
a display; and
a processing system, including one or more computer processors, configured to:
display, in a first display area, a partial subset of the first number of first objects;
display, in a second display area that is different from the first display area a second object representing the position among the first number of first objects, according to the order, of the partial subset which is currently displayed in the first display area; and
receive an operation input on the second display area, and change, based on the operation input having been received, the partial subset of first objects shown in the first display area.

\* \* \* \* \*